US006539063B1

(12) United States Patent
Peyla et al.

(10) Patent No.: US 6,539,063 B1
(45) Date of Patent: Mar. 25, 2003

(54) SYSTEM AND METHOD FOR RECOVERING SYMBOL TIMING OFFSET AND CARRIER FREQUENCY ERROR IN AN OFDM DIGITAL AUDIO BROADCAST SYSTEM

(75) Inventors: Paul James Peyla, Elkridge, MD (US); Joseph Bertram Bronder, New Market, MD (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/252,959

(22) Filed: Feb. 18, 1999

(51) Int. Cl.[7] .............................................. H04L 1/02
(52) U.S. Cl. ...................... 375/267; 375/270; 375/277; 375/321; 375/326; 375/347; 375/360; 370/319; 370/344; 370/503; 370/529; 455/47; 455/109; 455/204
(58) Field of Search ................................ 375/260, 267, 375/270, 275, 277, 321, 326, 335, 347, 349, 354, 355, 360; 370/319, 344, 464, 482, 503, 516, 517, 529; 455/47, 59, 109, 181.1, 182.1, 192.1, 204

(56) References Cited

U.S. PATENT DOCUMENTS

| | | | |
|---|---|---|---|
| 2,549,423 A | 4/1951 | Carlson | 250/6 |
| 2,880,275 A | 3/1959 | Kahn | 179/15 |
| 2,943,316 A | 6/1960 | Covely, 3rd | 343/17.1 |
| 3,364,482 A | 1/1968 | Sones | 343/5 |
| 3,555,427 A | 1/1971 | Hatton | 325/306 |
| 3,780,279 A | 12/1973 | Stover | 235/164 |
| 3,925,650 A | 12/1975 | Brown | 235/164 |
| 3,975,687 A | 8/1976 | Tan et al. | 325/304 |
| 4,281,412 A | 7/1981 | Wissel et al. | 375/86 |
| 4,344,180 A | 8/1982 | Cummisky | 375/116 |
| 4,727,534 A | 2/1988 | Debus, Jr. et al. | 370/20 |
| 5,187,711 A | 2/1993 | Hoohara | 371/7 |

(List continued on next page.)

FOREIGN PATENT DOCUMENTS

| | | |
|---|---|---|
| EP | 0 683 576 A1 | 11/1995 |
| WO | 9749207 | 12/1997 |

OTHER PUBLICATIONS

Kroeger, B., Vigil, A., "Improved IBOC DAB Technology For AM and FM Broadcasting", Oct. 1996.

M. Alard, R. Lassale, "Principles of modulation and channel coding for digital broadcasting for mobile receivers", EBU Review, No. 224, pp. 168–190, Aug. 1987.

(List continued on next page.)

*Primary Examiner*—Stephen Chin
*Assistant Examiner*—Dac V. Ha
(74) *Attorney, Agent, or Firm*—Robert P. Lenart; Pietragallo, Bosick & Gordon

(57) ABSTRACT

The system for recovering symbol timing offset and carrier frequency error from an orthogonal frequency division multiplexed (OFDM) signal includes a receiver circuit for receiving an OFDM modulated signal representing a series of OFDM symbols, and providing a received signal to an output thereof. A peak development circuit is included for developing a signal having a plurality of signal peaks representing symbol boundary positions for each received OFDM symbol, where each of the signal peaks is developed responsive to an amplitude and phase correspondence produced between the leading and trailing portions of each of the received OFDM symbols. The system includes a circuit for enhancing the signal peak detectability, which includes a circuit for additively superimposing and then filtering the signal peaks, to produce an enhanced signal peak having an improved signal-to-noise ratio. A circuit for establishing a temporal position indicative of the symbol boundary position from at least one of the enhanced signal peaks output from the signal enhancing module is also provided. Further, a circuit for recovering the received OFDM signal carrier frequency error corresponding to the temporal position is included.

52 Claims, 8 Drawing Sheets

U.S. PATENT DOCUMENTS

| | | | |
|---|---|---|---|
| 5,191,576 A | 3/1993 | Pommier et al. | 370/18 |
| 5,228,025 A | 7/1993 | Le Floch et al. | 370/20 |
| 5,313,169 A | 5/1994 | Fouche et al. | 329/302 |
| 5,345,440 A | 9/1994 | Gledhill et al. | 370/19 |
| 5,357,502 A | 10/1994 | Castelain et al. | 370/19 |
| 5,369,800 A | 11/1994 | Takagi et al. | 455/59 |
| 5,371,548 A | 12/1994 | Williams | 348/478 |
| 5,371,761 A | 12/1994 | Daffara et al. | 380/48 |
| 5,406,551 A | 4/1995 | Saito et al. | 370/19 |
| 5,416,767 A | 5/1995 | Koppelaar et al. | 370/23 |
| 5,428,647 A | 6/1995 | Rasky et al. | 375/366 |
| 5,450,456 A | 9/1995 | Mueller | 375/224 |
| 5,452,331 A | 9/1995 | Shihabi et al. | 375/324 |
| 5,471,464 A | 11/1995 | Ikeda | 370/19 |
| 5,506,836 A | 4/1996 | Ikeda et al. | 370/19 |
| 5,541,552 A | 7/1996 | Suzuki et al. | 329/307 |
| 5,548,819 A | 8/1996 | Robb | 455/59 |
| 5,550,812 A | 8/1996 | Philips | 370/19 |
| 5,559,833 A | 9/1996 | Hayet | 375/259 |
| 5,594,761 A | 1/1997 | Brown | 375/356 |
| 5,596,582 A | 1/1997 | Sato et al. | 370/509 |
| 5,602,835 A | 2/1997 | Seki et al. | 370/206 |
| 5,608,764 A * | 3/1997 | Sugita et al. | 375/260 |
| 5,627,863 A | 5/1997 | Aslanis et al. | 375/357 |
| 5,629,639 A | 5/1997 | Williams | 327/60 |
| 5,652,772 A | 7/1997 | Isaksson et al. | 375/367 |
| 5,657,313 A | 8/1997 | Takahashi et al. | 370/491 |
| 5,682,376 A | 10/1997 | Hayashino et al. | 370/206 |
| 5,687,165 A | 11/1997 | Daffara et al. | 370/208 |
| 5,694,389 A | 12/1997 | Seki et al. | 370/208 |
| 5,732,113 A | 3/1998 | Schmidl et al. | |
| 5,812,523 A * | 9/1998 | Isaksson et al. | 370/208 |
| 5,920,598 A * | 7/1999 | Hyakudai et al. | 370/206 |
| 5,949,796 A | 9/1999 | Kumar | |
| 6,381,251 B1 * | 4/2002 | Sano et al. | 370/210 |

OTHER PUBLICATIONS

Kroeger, B. W., Peyla, P.J., "Robust IBOC DAB AM and FM Technology For Digital Audio Broadcasting", Apr. 1997.

Hartup, D. C., Alley, D. M., Goldston, D. R., "AM Hybrid IBOC DAB System", Sep. 1997.

Cupo, R.L., Sarraf, M., Shariat, M. Zarrabizadeh, M., "An OFDM All–Digital In–Band On–Channel (IBOC) AM and FM Radio Solution Using The PAC Encoder", Sep. 1997.

Hong Et Al., "An Efficient Timing Synchronization Technique for FFT Based Multi–Carrier Direct Sequence Spread Spectrum Transceiver", *IEEE,* 1998, pp. 713–717.

Mochizuki Et Al., "A High Performance Frequency and Timing Synchronization Technique for OFDM", *IEEE,* 1998, pp. 3443–3448.

* cited by examiner

SYSTEM AND METHOD FOR RECOVERING SYMBOL TIMING OFFSET AND CARRIER FREQUENCY ERROR IN AN OFDM DIGITAL AUDIO BROADCAST SYSTEM

BACKGROUND OF THE INVENTION

1. Field of the Invention

The present invention relates to the field of digital communications, and more specifically, is directed to a system for acquiring or recovering a symbol timing offset and carrier frequency error from a digitally modulated, multi-carrier communications signal. The system of the present invention is further directed to a diversity system for recovering a symbol timing offset and carrier frequency error from a diverse, multi-frequency digitally modulated signal.

2. Prior Art

In a digital communication system, the acquisition of symbol synchronization between the transmitter and receiver must be achieved before effective symbol demodulation can commence at the receiver. Thus, the prior art in digital communications is replete with attempts to develop systems directed to the optimal recovery or acquisition of received symbol timing and carrier frequency.

One such attempt is provided in U.S. Pat. No. 5,541,552, by Suzuki, directed to the demodulation of digitally modulated multi-carrier symbols. The receiver in this Patent develops correlation peaks responsive to an intra-symbol correlation, as by conjugate product formations between the repetitive information and the amplitude tapering existing at the leading and lagging portions of each received symbol. The peaks must be detected, for their positions are indicative of received symbol timing. However, their relatively flat amplitude profiles necessitate their individual integration prior to the peak detection thereof.

This simplistic signal processing scheme in Suzuki, i.e., mere integration of correlation peaks prior to their detection, provides sub-optimal synchronization results on at least two accounts. First, as the number of frequency carriers is increased in the multi-carrier symbol, the correlation peak becomes obscured by adjacent noise, and mere integration fails to sufficiently enhance the signal-to-noise ratio of the pre-detected correlation peaks. Second, mere integration fails to combat well known signal propagation effects, such as scattering, correlation peaks. Second, mere integration fails to combat well known signal propagation effects, such as scattering, fading, or other signal interferers, all of which combine to cause signal drop-outs and false peaks.

In contrast to Suzuki and other prior art acquisition systems, the system of the present invention presents an optimum scheme for the recovery of symbol timing and carrier frequency. This optimum approach is provided through an application of signal processing techniques that, when taken either alone or in combination, improve over the prior art. These signal processing improvements include the additive superposition of repeating signals, optimum or matched filtering, and diversity selection and combining between diverse, modulated signals.

The following is a list of prior art references known to Applicant: U.S. Pat. Nos. 5,694,389; 5,602,835; 5,608,764; 5,559,833; 5,687,165; 5,541,552; 5,357,502; 3,925,650; 5,596,582; 3,364,482; 2,943,316; 3,975,687; 5,594,761; 4,281,412; 5,187,711; 4,727,534; 5,369,800; 5,548,819; 2,549,423; 2,880,275; 3,555,427; 5,629,639; 5,428,647; 5,682,376; 5,416,767; 5,452,331; 4,344,180; 5,657,313; 5,652,772; 5,627,863; 5,550,812; 5,506,836; 5,471,464; 5,450,456; 5,371,761; 5,345,440; 5,313,169; 5,228,025; 5,191,576; 5,371,548; 5,406,551; and, 3,780,279.

SUMMARY OF THE INVENTION

It is an object of the present invention to provide a system for optimally recovering symbol timing and carrier frequency from a digitally modulated, multi-carrier signal. Particularly, the digitally modulated signal is an orthogonal frequency division multiplexed (OFDM) signal that can include a large number of frequency carriers therein.

One aspect of the present invention presents a system for recovering a symbol timing offset and carrier frequency error from an OFDM signal. The system includes a receiver module for receiving the OFDM modulated signal which is represented as a series of OFDM symbols. Each OFDM symbol includes a leading portion and a trailing portion thereof. The leading and trailing portions have substantially equivalent phases and have temporally weighted amplitudes according to a predetermined temporal weighting function. The receiver module provides a received signal to an output thereof.

The system also includes a signal peak development module which develops a boundary signal having a plurality of signal peaks representing a symbol boundary position for each of the received OFDM symbols. Each of the signal peaks is developed responsive to an amplitude and phase correspondence produced between the leading and trailing portions of the received OFDM symbol.

The system further includes a signal enhancing module that enhances signal peak detectability of the boundary signal. The signal enhancing module includes a circuit for additively superimposing a plurality of segments of the boundary signal. The signal enhancing module outputs an enhanced signal peak corresponding to a predetermined number of the plurality of segments and having an. improved signal-to-noise ratio.

The system includes a circuit for establishing a temporal position indicative of the symbol boundary position from at least one of the enhanced signal peaks output from the signal enhancing module. The temporal position represents a received OFDM symbol timing offset.

A circuit for recovering the received OFDM signal carrier frequency error in correspondence with said temporal position is also included in the system.

In another aspect of the present invention, the signal enhancing module further includes a matched filter for filtering signals produced responsive to the boundary signal. The matched filter further improves a signal-to-noise ratio of the enhanced signal peaks output from the signal enhancing module. The matched filter has a temporal impulse response matched to the amplitude envelope of the signal peaks present in the boundary signal.

Another object of the present invention is the improvement of the symbol timing and frequency carrier acquisition process through the application of signal diversity selection and combining. In the diversity aspect of the present invention, a diversity system for recovering a symbol timing offset and carrier frequency error from the OFDM signal includes a transmitter for transmitting an OFDM modulated signal in both an upper and a lower frequency sideband. Each of the sidebands encompasses a plurality of OFDM modulated frequency carriers and a series of OFDM symbols.

The diversity system includes a receiver portion for receiving the OFDM modulated signal of the upper frequency sideband and providing a first or upper sideband received signal output and the OFDM modulated signal of the lower frequency sideband and providing a second or lower sideband received signal output.

The diversity system also includes a first recovery circuit for developing a first or upper sideband symbol timing offset corresponding to OFDM symbols in the first received signal, and a second recovery circuit for developing a second or lower sideband symbol timing offset corresponding to OFDM symbols in the second received signal.

Further, the diversity system includes a first validation circuit for validating the first symbol timing offset based on a predetermined temporal consistency thereof, and a second validating circuit validating said second symbol timing offset based on a predetermined temporal consistency thereof.

Still further, the diversity system includes a selection circuit for selecting an optimum symbol timing offset from the first and second symbol timing offsets responsive to signals output from the first and second validating circuits, and a demodulator circuit for demodulating at least one of the series of OFDM symbols using the optimum symbol timing offset.

A further aspect of the diversity system includes a circuit for developing a third or combined symbol timing offset corresponding to a combination of first and second timing signals respectively representative of the first and second symbol timing offsets, and a circuit for selecting the third symbol timing offset responsive to a plurality of conditional input signals.

DESCRIPTION OF THE PREFERRED EMBODIMENTS

In a digital communication transmission-reception scheme wherein a series of digitally modulated information carrying signals are transmitted to a receiver whereat demodulation of the symbols is to occur in order to recover the information conveyed thereby, the receiver demodulator can achieve successful and optimum demodulation of the symbols only if the transmitted symbol timing and phase/frequency are ascertainable at the receiver. Thus, prior to such successful demodulation of the received symbols, the receiver must acquire or recover the received symbol timing and carrier phase/frequency, both of which are to be utilized by the demodulation process. Once received symbol timing and frequency have been recovered at the receiver and thereafter the demodulation of the symbol has begun, symbol timing and carrier frequency can be tracked by way of a servoloop in order to maintain the integrity of the demodulation process. The system or architecture in the present invention is directed to the transmission of a series of digitally modulated symbols to a receiver whereat demodulation of the symbols is to occur. More particularly, the system in the present invention is directed to the acquisition of received symbol timing offset and carrier phase/frequency error so that effective demodulation and subsequent tracking of symbol timing and carrier frequency can commence.

Figure 1A:
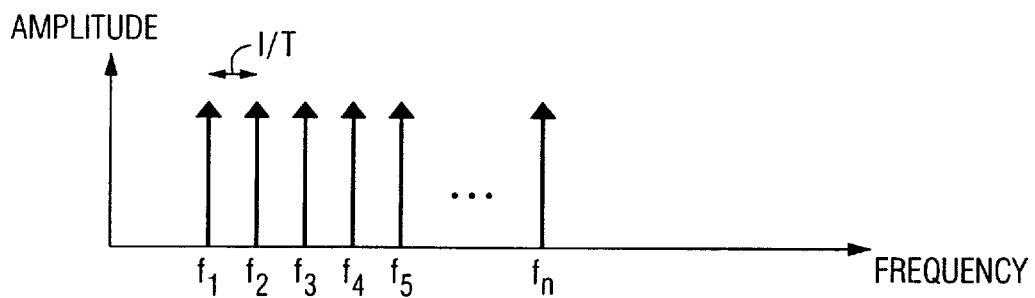
FIG. 1a is a graphical representation of the OFDM signal in the frequency domain.

The system and method for acquiring or recovering symbol timing offset and frequency error in the present invention is particularly well suited to an environment wherein the transmitter transmits and the receiver receives an orthogonal frequency division multiplexed (OFDM) signal. Referring to FIG. 1a, the OFDM signal used in the present invention is characterized as a multi-frequency carrier signal comprising the plurality of equidistantly spaced sub-carriers f1–fn. Adjacent sub-carriers, such as f1 and f2, are separated each from the other by a predetermined frequency increment such that adjacent sub-carriers are orthogonal, each to the other. By orthogonal, it is meant that when properly Nyquist weighted, the subcarriers exhibit no crosstalk. In one hybrid system incorporating the instant invention and using both digital and analog transmission channels, there are 191 carriers in each sideband with a 70 kHz bandwidth for each sideband. In one all digital implementation of the instant invention there are 267 carriers in each sideband with a 97 kHz bandwidth for each sideband.

Figure 1B:
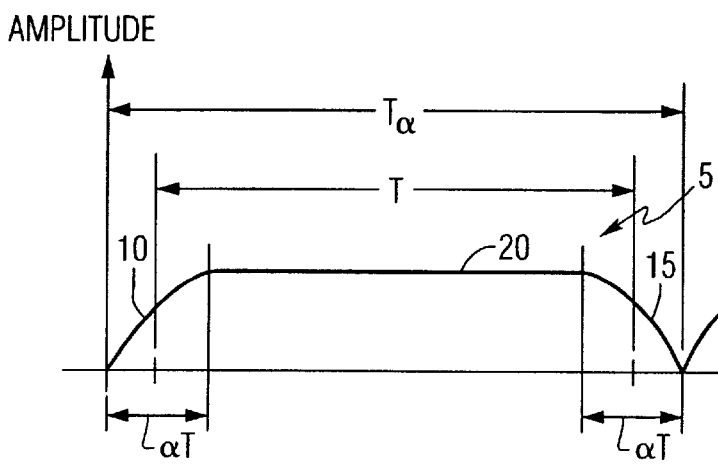
FIG. 1b is a graphical representation of the OFDM signal in the time domain.

Referring to FIG. 1b, in the time domain, each OFDM symbol 5 has an effective symbol period or temporal width T, and a full symbol period $T_\alpha$. The OFDM subcarrier orthogonality requirement creates a functional interdependency between the effective symbol period T and the frequency spacing between adjacent OFDM subcarriers. Specifically, the frequency separation between adjacent subcarriers is constrained to be equivalent to the inverse of the effective symbol period T of each OFDM symbol 5. That is, the frequency separation is equal to 1/T.

Turning again to FIG. 1b, extending across the effective symbol period T of each OFDM symbol 5 are a predetermined number N of equidistantly spaced temporal symbol samples (not shown in the Figure). Further, extending across the full period $T_\alpha$ of each OFDM symbol 5 are a predetermined number $N_\alpha = N(1+\alpha)$ of equidistantly spaced temporal symbol samples. As will be described subsequently in this disclosure, $\alpha$ is the amplitude tapering factor for the symbol, and can be considered here as a fractional multiplier. Even further, predetermined amplitude-time profile or envelope 10,15,20 is imposed upon the signal levels of these samples. This amplitude profile includes symmetrically ascending and descending amplitude tapers 10,15 at the leading portion and trailing portion of each symbol 5, respectively, and a relatively flat amplitude profile 20 extending therebetween. These rounded or tapered edges provided in the time domain serve to substantially reduce undesirable side-lobe energy in the frequency domain, to thus provide a more spectrally efficient OFDM signal. Although the full symbol period $T_\alpha$ of symbol 5 extends beyond the effective symbol period T, orthogonality between adjacent sub-carriers in the frequency domain (FIG. 1a) is not compromised so long as amplitude tapers 10,15 of symbol 5 follow a Nyquist or raised-cosine tapering function. More specifically, orthogonality is maintained in the present invention through a combination of root-raised cosine weighting (or amplitude tapering) of transmitted symbols and root-raised cosine matched filtering of received symbols.

The leading and trailing portions of OFDM symbol 5 share an additional important feature, namely, the first N OFDM symbol samples extending across the leading portion of OFDM symbol 5, which has a temporal duration $\alpha T$, have substantially equivalent phases as the last $\alpha N$ symbol samples extending across the trailing portion of OFDM symbol 5, which also has a temporal duration $\alpha T$. Note again that $\alpha$ is the amplitude tapering factor for the symbol, and can be considered here as a fractional multiplier. As will be described more fully herein, these predetermined amplitude and phase properties inherent in the leading and trailing portions of the OFDM symbol of the present invention, namely, the tapering of sample amplitudes in the leading and trailing portions of each OFDM symbol and the equivalent phases thereof, are advantageously exploited in the system of the subject invention in order to efficiently acquire OFDM symbol timing and frequency in the receiver, so that the demodulation of the symbol can commence.

Figure 2:
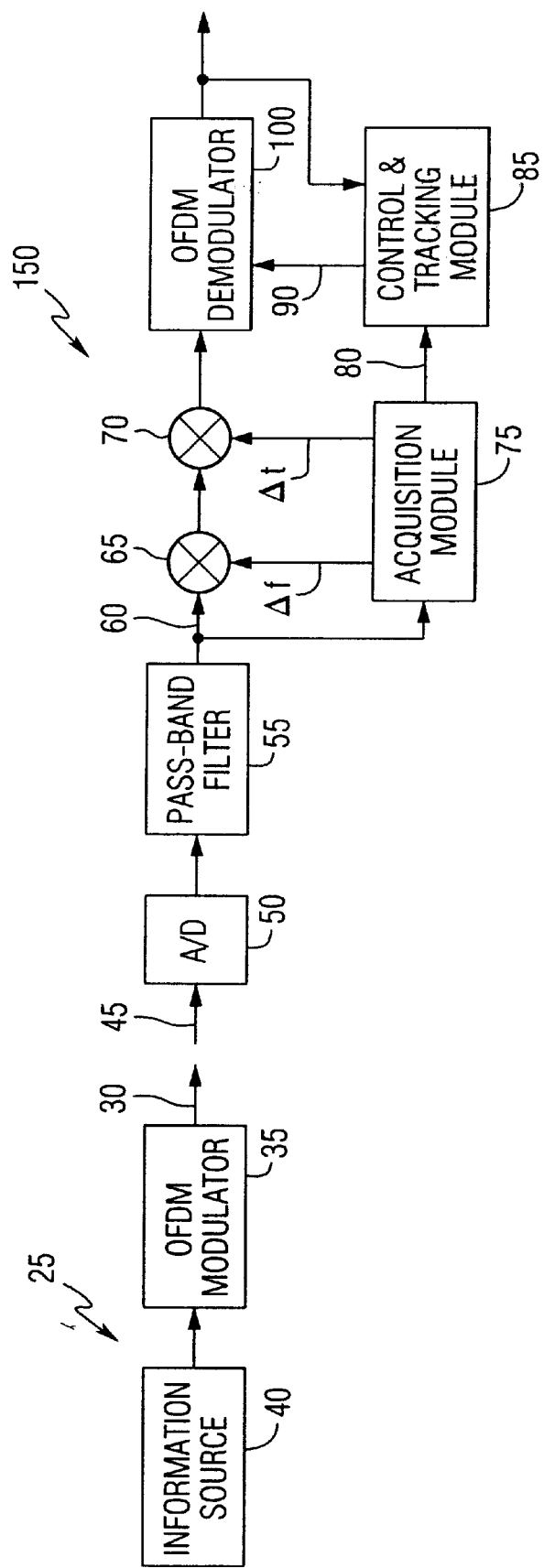
FIG. 2 is a partial block diagram illustrating the front end portion of the present invention.

Having described the characteristics of the OFDM symbol used in the present invention, the system for recovering system timing in the present invention is now described. Referring to FIG. 2, the digital communication transmission-reception system of the present invention includes an OFDM modulator module 25 for generating OFDM modulated transmit signal 30 at an output thereof, which is transmitted to OFDM signal receiver 150 for demodulation thereat by OFDM demodulator 100. OFDM transmit signal 30 generated by OFDM modulator 25 conforms to the OFDM signal specifications shown in FIGS. 1a and 1b and described previously. That is, OFDM modulator 25 generates a series of OFDM symbols 5, as shown in FIG. 1b, each of which comprises a predetermined number of temporal symbol samples $N_\alpha$ corresponding to full symbol period $T_\alpha$, wherein the first $\alpha N$ samples and the last $\alpha N$ samples of each symbol are tapered and have equal phases. To facilitate further discussion of symbol signal processing, it will be assumed that the predetermined number $N_\alpha$ of temporal samples extending across each full symbol period $T_\alpha$ is 1080, that the predetermined number N of temporal samples extending across each effective symbol period T is 1024, and that the number of samples in each of the first $\alpha N$ samples and last $\alpha N$ samples is 56, however, these values are merely exemplary and may be varied in accordance with system requirements. Note further that information source 40 provides information signals to an input of OFDM modulator 35, which information signals are modulated onto OFDM symbols in signal 30.

OFDM transmit signal 30 is transmitted to OFDM signal receiver 150 by any mechanism and through any medium known in prior art communication systems. For example, OFDM transmit signal 30 can be provided as an analog signal, a radio frequency signal such as an audio broadcast signal, or alternatively, can be provided even as a digital base band signal. The physical mediums 45 through which signal 30 is transmitted can be atmospheric, optical, wireline, or otherwise. Alternatively, transmit signal 30 can be a computer generated signal suitable for simulation purposes, that is, a computer generated signal that is communicated between software program modules, as between a computer program based OFDM modulator module, and a computer program based OFDM signal receiver module. None of the foregoing variations affect the advantageous application of the system architecture and techniques of the present invention to provide OFDM symbol timing offset and frequency error acquisition.

OFDM transmit signal 30 is received by OFDM signal receiver 150 which includes a front-end receiver module, not shown, as is known in the prior art, and which suitably accommodates the method and medium of transmission chosen for any given application. In the embodiment of FIG. 2, this front-end receiver provides an analog OFDM signal 45 to the input of analog-to-digital converter (A/D) 50. A/D 50 samples or digitizes analog received signal 50 input thereto to produce a signal at an output thereof comprising a series of complex signal samples. The signal samples are complex in that each complex sample actually comprises a pair of signal samples including a "real" sample and an "imaginary" sample, which is sampled in quadrature to the real sample. The sampled signal is next filtered by pass-band filter 55 which has a pass-band frequency response comprising the collective set of subcarriers f1–fn present in the received OFDM signal.

Received complex signal 60, having been sampled and filtered, is next frequency corrected by frequency correction circuit or module 65. The resulting frequency corrected signal is then time corrected by timing correction circuit or module 70. The frequency and time corrected signal output by time correction circuit 70 feeds the input to OFDM demodulator 100 which demodulates the frequency and time corrected received signal input thereto.

Received complex signal 60 is additionally routed to the input of acquisition module 75, which is the subject of the present invention. Acquisition module 75 acquires or recovers OFDM symbol timing offset or error and carrier frequency offset or error from the received OFDM symbols as represented in received complex signal 60, thus providing symbol timing offset $\Delta t$ and carrier frequency offset $\Delta f$ as inputs to timing correction circuit 70 and frequency correction circuit 65, respectively. Acquisition module 75 further develops acquisition status signal 80 which is provided as an input to control and tracking module 85. Control and tracking module 85 controls the operation of demodulator 100 via demodulator control signal 90. Control and tracking module 85, in concert with the timing offset and frequency error provided thereto by acquisition module 75, permits the accurate recovery of overall symbol timing and carrier frequency by the OFDM receiver.

Figure 3:
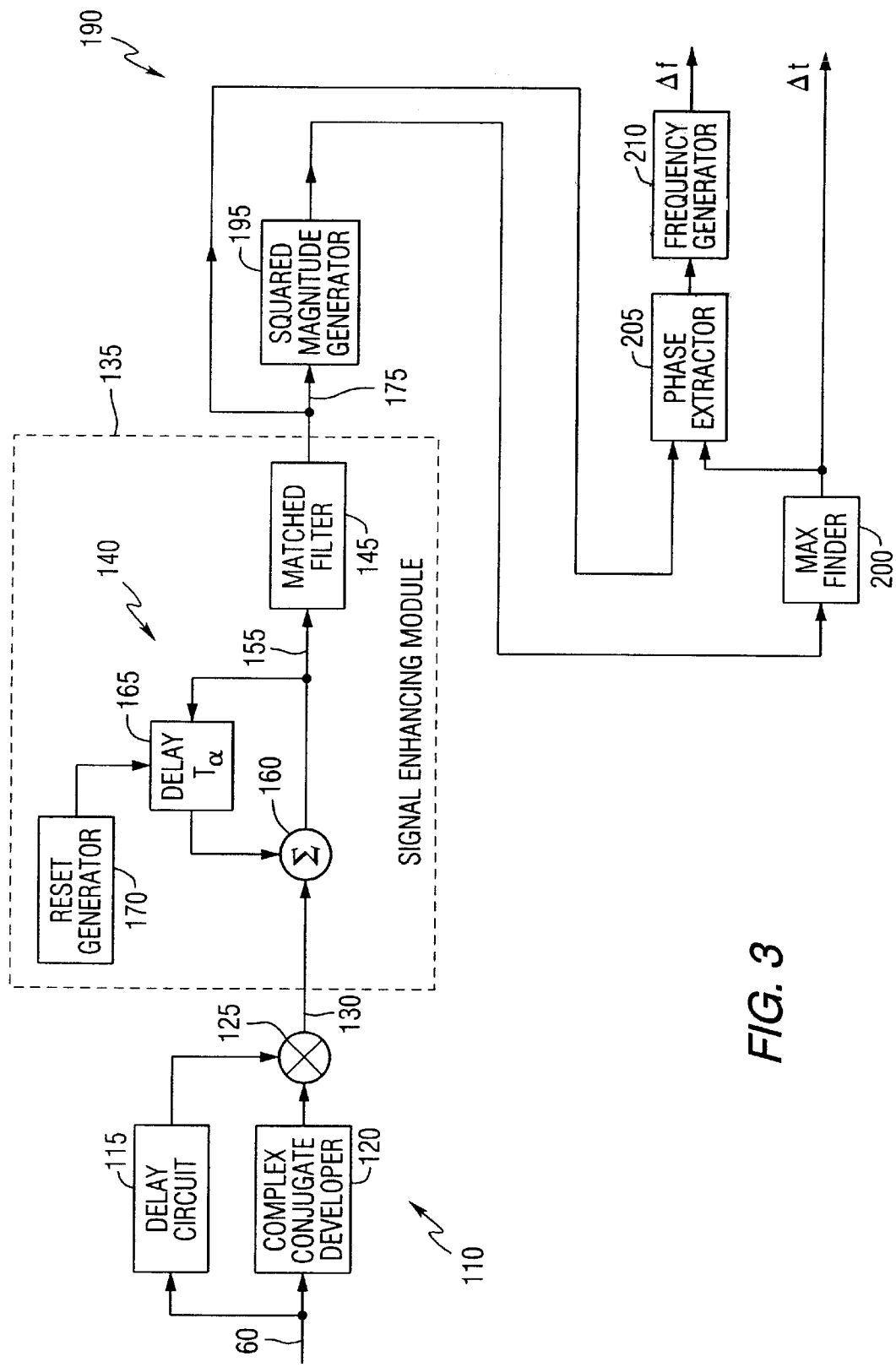
FIG. 3 is a block diagram of a first embodiment of the acquisition module of the present invention.

Referring to FIG. 3, in a first embodiment of acquisition module 75, received complex signal 60 is provided to the input of peak development module 110, which provides the first stage of signal processing for acquiring the symbol timing offset of the received OFDM signal. Peak development module 110 develops a boundary signal 130 at an output thereof, which has a plurality of signal peaks therein, each signal peak representing a received symbol boundary position for each received OFDM symbol represented in received signal 60, input to peak development module 110. Since these signal peaks represent received symbol boundary positions, their temporal positions are indicative of received symbol timing offset. More specifically, since the receiver has no initial or a priori knowledge of the true or actual received symbol boundary position, such a position is initially assumed or arbitrarily created to enable receiver processing to operate. Acquisition module 75 establishes the symbol timing offset Δt that exists between this a priori assumption and the true, received symbol boundary position, thus enabling the receiver to recover and track symbol timing.

In developing the signal peaks representing OFDM symbol boundaries, peak development module 110 exploits the predetermined amplitude tapering and equivalent phase properties inherent in the leading and trailing portions of each received OFDM symbol. Particularly, complex conjugate multiplies or products are formed between the current sample and the sample preceding it by N samples. Such products, formed between the first αN samples and the last αN samples in each symbol, produce a signal peak corresponding to each symbol comprising the αN conjugate products so formed.

Figure 1C:
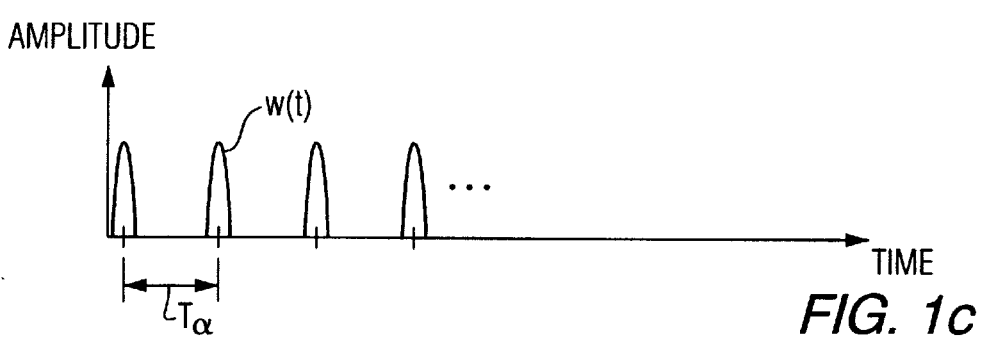
FIG. 1c is a graphical representation of the conjugate product signal peaks representing symbol boundaries.
Figure 1D:
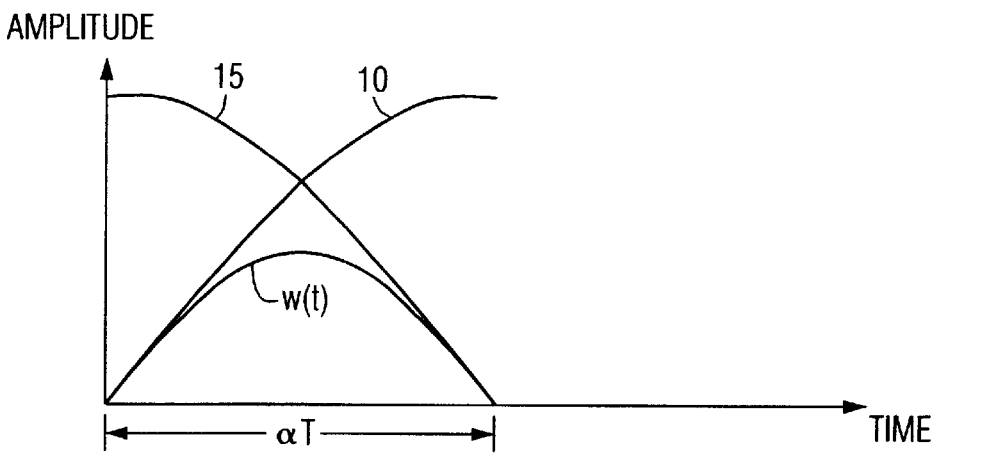
FIG. 1d is a graphical illustration of the conjugate products multiplied by respective amplitude tapers.

Mathematically, the formation of the conjugate products is represented as follows. Let D(t) denote the received OFDM signal, and let $T_\alpha=(1+\alpha)T$ denote the full OFDM symbol duration or period where 1/T is the OFDM channel spacing and α is the amplitude tapering factor for the symbol. The signal peaks in boundary signal 130 appear as a train of pulses or signal peaks in the conjugate products of D(t)*D·(t−T). As a result of the Nyquist amplitude tapering imposed on the leading and trailing portions of each OFDM symbol, each of the pulses or signal peaks has a half-sine-wave amplitude profile of the form w(t)={½ sin (πt/(αT)), for 0≤t≤αT, and w(t)={0, otherwise Further, the periodicity of signal 130, that is, the period of the train of signal peaks, is $T_\alpha$. Referring to FIG. 1c, the train of signal peaks included in boundary signal 130 has amplitude envelope w(t) and the peaks are spaced by a period of $T_\alpha$. Referring to FIG. 1d, the product of the overlapping leading and trailing portion amplitude tapers 10,15 multiplies the squared magnitudes in the conjugate products, resulting in the half-sine-wave, w(t) which has a durational width αT corresponding to αN samples.

Returning again to FIG. 3, for each signal sample input to peak development module 110, one product sample is output from multiplier circuit 125 representing a conjugate product between that input sample and a predecessor sample spaced T samples therefrom. Complex conjugate developer 120 produces at its output the complex conjugate of each input sample, which output is provided as one input to multiplier 125. The conjugate samples at this output are multiplied against the delayed sample output from delay circuit 115. In this way, complex conjugate products are formed between the received signal 60 and a delayed replica thereof obtained by delaying the received signal 60 by the predetermined time T using delay circuit 115.

Figure 6A:
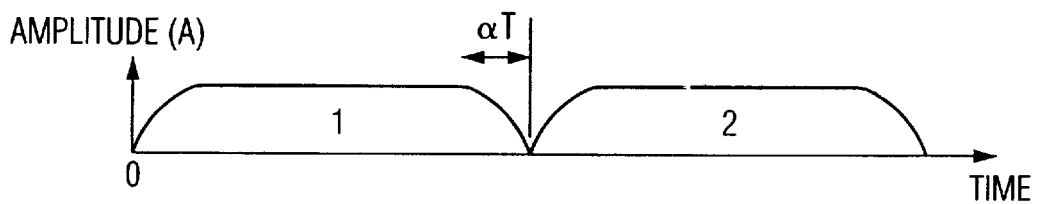
FIGS. 6a, 6b and 6c are graphical representations of symbol timing for the peak development module of the present invention.
Figure 6B:
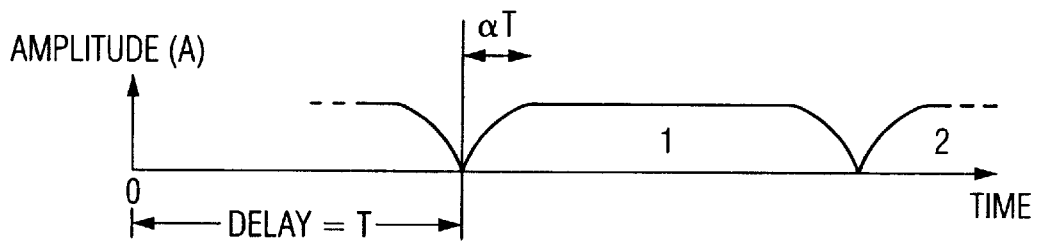
Figure 6C:
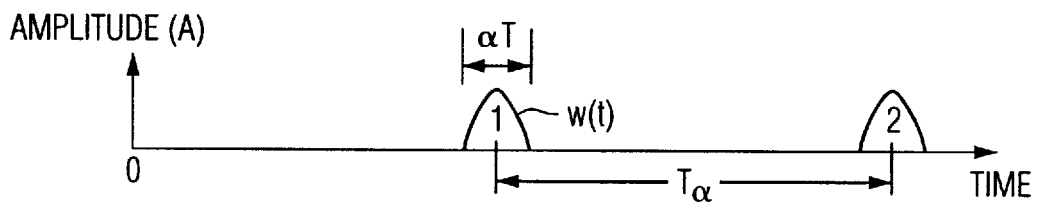

Referring to FIG. 6, relevant symbol timing for peak development module 110 is illustrated. FIG. 6a represents consecutive OFDM symbols 1 and 2 provided at the input to peak development module 110. FIG. 6b illustrates the delayed versions of OFDM symbols 1 and 2 as output from delay circuit 115. FIG. 6c represents the signal peak developed for each corresponding set of $N_\alpha=N(1+\alpha)$ product samples (which in one working embodiment equals 1080 samples), the train of signal peaks being produced responsive to the conjugate multiplication between the received signal of FIG. 6a and the delayed version thereof in FIG. 6b.

By way of specific example, if the received OFDM symbol period $T_\alpha$ corresponds to $N_\alpha=1080$ signal samples, and the αN samples at each of the leading and trailing portions of the symbol correspond to 56 signal samples, then for each 1080 sample OFDM symbol input to peak development module 110, there appears a corresponding set of 1080 product samples in boundary signal 130. In this example, delay circuit 115 imparts a 1024 (N) sample delay so that each sample input to multiplier 125 is multiplied by its predecessor 1024 samples away. The signal peak so developed for each corresponding set of 1080 product samples comprises only 56 conjugate products formed between the first and last 56 samples of each corresponding symbol.

Peak development module 110 can be implemented in any number of ways as long as the correspondence between the leading and trailing portions of each symbol are exploited in the manner previously described. For instance, peak development module 110 may operate on each sample as it arrives, so that for each sample in, a product sample is provided at the output thereof. Alternatively, a plurality of samples may be stored, such as in vector form, thus creating present sample vectors and delayed sample vectors, which vectors can be input to a vector multiplier to form vector product samples at an output thereof Alternatively, the peak development module can be implemented to operate on continuous rather than sampled discrete time signals. However, in such an approach, it would be desirable that input received signal 60 also be a continuous rather than a sampled signal.

Ideally, boundary signal 130 has easily identifiable signal peaks therein, as illustrated in FIGS. 1c and 6c, however, in reality, each signal peak is virtually indistinguishable from the undesired noisy products of samples lying in adjacent symbols. Since peak development module 110 continually forms products between samples extending across each received symbol and predecessor samples delayed therefrom, boundary signal 130 includes both desired signal peaks as well as the noisy conjugate products. For example, the first αN (56) samples in each symbol are indeed multiplied against the last αN samples therein, to produce the desired signal peak αN samples in duration. However, the remaining N (1024) samples are multiplied against N samples from the adjacent symbol responsive to the delay imparted thereto by delay circuit 115 (See FIG. 6). These additional unwanted products have the effect of filling in noise between the occurrences of the desired signal peaks. An increase in the number of frequency carriers comprising the OFDM signal produces a corresponding increase in the level of these noisy products present in the boundary signal. Thus, noisy products corresponding to OFDM signals comprising, for example, between 80 and 300 carriers, can be appreciable.

Figure 7A:
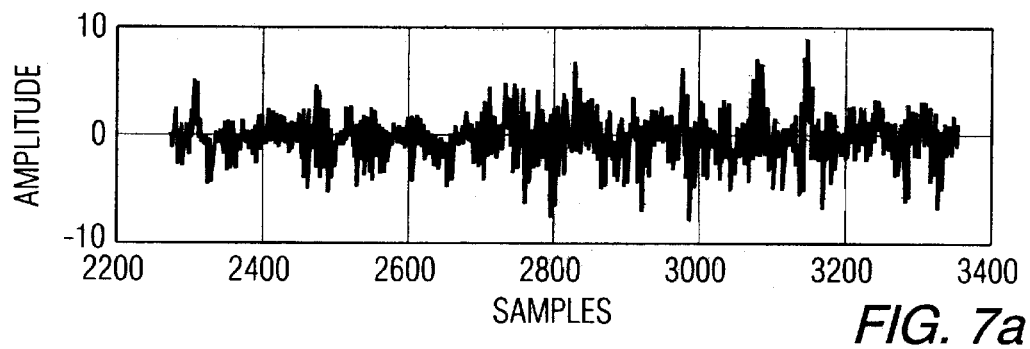
FIGS. 7a, 7b, 7c and 7d are graphical representations illustrating the signal processing performed by the present invention.

FIG. 7a graphically illustrates boundary signal 130 corresponding to an OFDM signal of 1080 samples. The X-axis corresponds to the number of samples and is thus indicative of timing, while the Y-axis corresponds to sample amplitude. Only the real portion of the complex signal is graphed since the imaginary portion is similar thereto. Clearly, the desirable signal peak, present between samples 2400 and 2500, is obscured by the aforementioned noisy products.

In addition to the presence of the aforementioned product noise in boundary signal 130, is noise derived from other sources well known in the art of digital communications. Such noise is imparted to the signal during propagation thereof through the atmosphere by scattering, multi-path and fading, and signal interferences. The front-end of the receiver also adds noise to the signal.

Subsequent signal processing stages in the present invention are dedicated, in part, to combat the depreciating effect of the aforementioned noise with respect to the desired signal peaks in boundary signal 130, or more specifically, to improve the signal-to-noise ratio of the signal peaks present in boundary signal 130. Signal enhancing module 135 is provided at the output of peak development module 110, and comprises first and second stage signal enhancing circuits or modules. The first stage signal enhancing circuit is an additive superposition circuit or module 140 and the second stage enhancing circuit is a matched filter 145, provided at the output of the first stage enhancing circuit.

Additive superposition circuit 140 additively superimposes a predetermined number of signal peaks and their surrounding noisy products, to enhance signal peak detectability by increasing the signal-to-noise ratio of the signal peaks in boundary signal 130. To implement this process of additive superposition, a predetermined number of consecutive segments of boundary signal 130 are first superimposed or overlapped in time. Each of these superimposed segments comprises a symbol period's worth of conjugate product samples as are output from peak development module 110, and includes a desired signal peak surrounded by undesired noisy product samples.

After the predetermined number or block of signal segments have been time overlapped, the product samples occupying a predetermined temporal position in the superimposed set of segments are accumulated to form a cumulative signal sample for that predetermined position. In this way, a cumulative signal is developed comprising a cumulative signal sample for each of the predetermined sample positions extending across the superimposed boundary signal segments.

If, for example, 32 contiguous boundary signal segments are to be superimposed, and if each segment includes a symbol period's worth of 1080 samples, then additive superposition circuit 140 produces 1080 cumulative samples for each contiguous block of 32 segments (1080 samples per segment) input thereto. In this manner, the conjugate products of 32 segments (each segment including 1080 samples, a signal peak and noise therein) are additively superimposed or "folded" on top of one another, by pointwise adding the superimposed conjugate products of the 32 segments. Essentially, in this folding process, the products of the 32 segments, are pointwise added to corresponding conjugate products one symbol period (or 1080 samples) away, over the 32 contiguous symbols, to produce a cumulative signal segment comprising 1080 cumulative samples therein. The signal processing is then repeated for the next contiguous block of 32 boundary signal segments, to produce another cumulative signal segment, and so on.

The cumulative signal segment produced by additively superimposing the predetermined number of contiguous segments of boundary signal 130 includes an enhanced signal peak therein, which exhibits an increased signal-to-noise ratio with respect to the signal peaks in each of the constituent input boundary signal segments. The reason for this enhancement is that the superposition of the boundary signal segments aligns their respective signal peaks, so that when the segments are accumulated, each signal peak adds to the next, thus achieving a form of coherent processing gain based upon the repetitive nature of the boundary signal peaks.

Whereas the aligned, repetitive signal peaks in the boundary signal segments coherently accumulate to form an enhanced (cumulative) signal peak at the output of the additive superposition module 140, by contrast, the random nature of the noisy conjugate products surrounding the signal peak in each of the boundary signal segments produce incoherent addition thereof during the additive superposition process. Since the signal peaks add coherently and the surrounding noisy products add incoherently and are thus averaged, the enhanced signal peak output from the additive superposition module 140 exhibits, overall, an improved signal-to-noise ratio.

The processing gain and signal-to-noise ratio enhancement achieved by the additive superposition module increases along with the number of boundary signal segments superimposed to produce the cumulative signal segment. Offsetting this advantage is a corresponding disadvantageous increase in acquisition delay, since more boundary signal segments are collected to produce the cumulative signal peak. Thus, the particular predetermined number, for instance 32, represents in any application a balancing between these two competing interests.

In mathematical terms, the additive superposition of contiguous segments of the conjugate products present in boundary signal 130 can be expressed by the following:

$$F(t) = \sum_{k=0}^{K-1} D(t + kT_\alpha) * D^*(t - T + kT_\alpha)$$

An important aspect of the foregoing signal processing is that symbol timing is preserved at each stage thereof: OFDM symbols input to peak development module 110, boundary signal segments input to additive superposition circuit 140, and cumulative signal segments output therefrom, each have a temporal period of $T_\alpha$ (corresponding to N=1080 samples). In this way, symbol timing offset, as indicated by the positioning of the signal peaks within a signal segment, is preserved throughout.

Figure 7B:
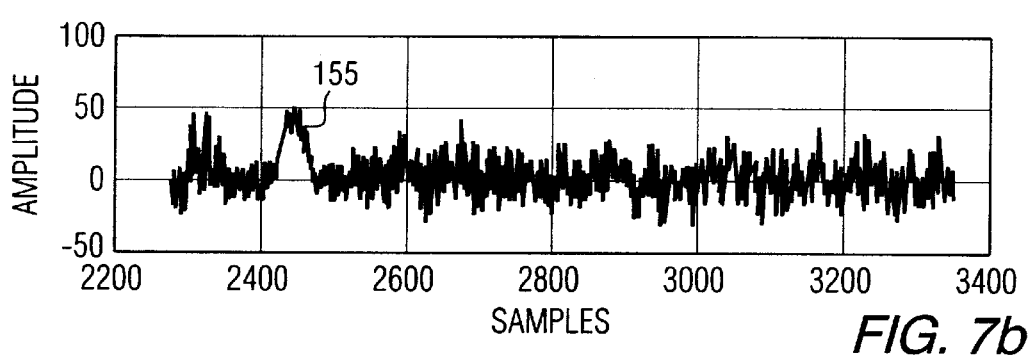

FIG. 7b graphically illustrates the cumulative signal waveform, or more specifically, the cumulative signal segment output from additive superposition module 140. Only the real portion of this complex signal is graphed since the imaginary portion is similar thereto. The cumulative signal segment of 1080 samples is formulated for a contiguous block of 32 boundary signal input segments, having 1080 samples each. In FIG. 7b, enhanced signal peak 155 is more clearly distinguishable from the surrounding accumulated noise products, whereas prior to additive superposition (FIG. 7a), the To further enhance the signal-to-noise ratio of enhanced signal peak 155, the cumulative signal output from additive superposition module 140 is input to matched filter 145. The temporal impulse response of matched filter 145 is matched to the shape or amplitude envelope of the enhanced signal peak input thereto, and in one embodiment of the present invention, follows a root-raised cosine profile. Specifically, the impulse response of the matched filter corresponds to the function w(t), as shown in FIG. 1d, and is determined by pointwise multiplying the first $\alpha$N samples of symbol 5 with the last $\alpha$N samples thereof. See FIGS. 1b and 1d.

Figure 7C:
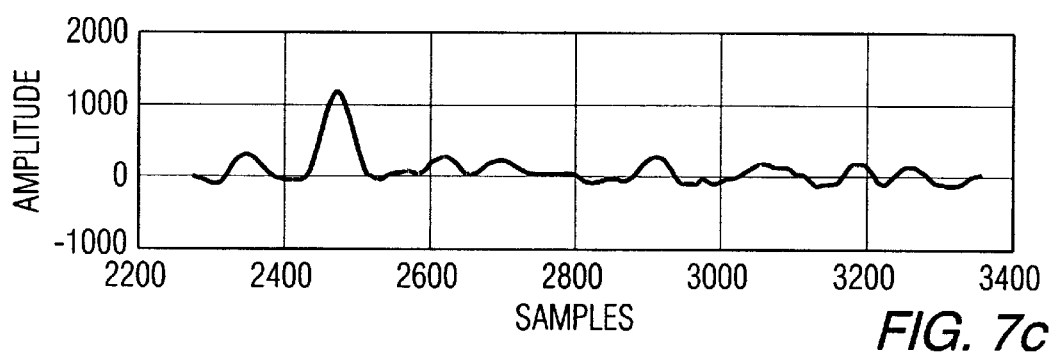

Although a non-matched low-pass filter could be used to smooth the noise present in the cumulative signal, the matched filter 145 provides the optimum signal-to-noise improvement for the desired signal, enhanced signal peak 155, in a Gaussian noise environment. Matched filter 145 is implemented as a finite impulse response (FIR) digital filter that provides at an output thereof a filtered version of the complex samples input thereto. FIG. 7c illustrates only the real portion of the filtered signal output from matched filter 145, since the imaginary signal is similar thereto. The discernability of the enhanced signal peak at the output of the matched filter, FIG. 7c, is clearly improved compared to the discernability of the enhanced signal peak at the input to the matched filter, FIG. 7b. The imaginary portion of the complex signal output from the matched filter 145 is similarly improved.

Briefly summarizing the signal processing stages leading up to the output of the matched filter, peak development module 110 produces a plurality of signal peaks, the temporal positions of which represent symbol boundary positions which represent symbol timing offset for each received OFDM symbol. Signal enhancing module 135 enhances the detectability of the signal peaks by first additively superimposing a predetermined number of input signal segments to produce a cumulative signal segment having an enhanced peak therein, and then second, matched filtering the cumulative signal segment to produce a cumulative, matched-filtered signal segment that is optimally ready for subsequent peak detection processing. This process continually operates to produce a plurality of filtered enhanced signal peaks at the output of signal enhancing module 135. The temporal positions of these filtered enhanced signal peaks within the match-filtered, cumulative signal segments output from signal enhancing module 135, are indicative of symbol boundary positions or OFDM symbol timing offset.

Taken individually, and especially in combination, the additive superposition module and matched filter advantageously enhance signal peak detectability in the present invention. Their introduction subsequent to the peak development stage permits the effective use of an OFDM signal comprising a large number of frequency carriers, and that is operating in a propagationally noisy signal environment.

The next stage of signal processing required to establish symbol timing offset is to detect the temporal position of the signal peak output from signal enhancing module 135. The temporal position of the signal peak is, in actuality, the sample index, or sample number, of the enhanced signal peak within the filtered, cumulative signal segment output from the matched filter.

Figure 7D:
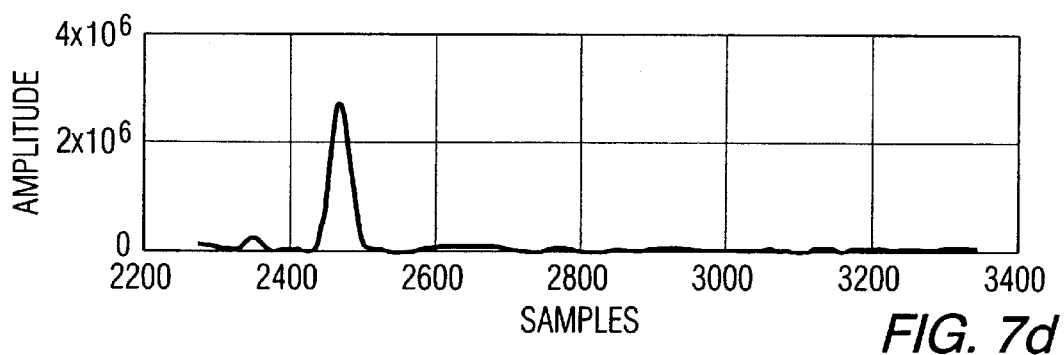

Filtered complex signal 175 output from matched filter 145 is provided as an input to peak selector module 190, which detects the enhanced filtered signal peak and the temporal position, or sample index, thereof. In operation, squared magnitude generator 195 of peak selector 190 squares the magnitude of the complex signal samples input thereto to generate a signal waveform at the output thereof, as illustrated in FIG. 7d. The output of squared magnitude generator 195, FIG. 7d, is provided as an input to max finder 200 which examines the sample magnitudes input thereto and identifies the temporal position or sample index corresponding to the signal peak.

This temporal position of the signal peak is provided, essentially, as the symbol timing offset that is provided by acquisition module 75 to an input of symbol timing correction circuit 70. It should be appreciated that the temporal position provided as the timing offset $\Delta t$ may require slight adjustments to compensate for various processing delays introduced by the preceding signal processing stages. For example, initialization delays in loading filters, etc., can add delays that need to be calibrated out of the final timing offset estimate. However, such delays are generally small and implementation specific.

After the temporal position of the signal peak has been determined (to establish symbol timing offset), the next stage in signal processing is to determine the carrier phase error and corresponding carrier frequency error of the received OFDM signal. The matched-filtered, enhanced signal peak in complex signal 175 represents the cleanest point, or point of maximum signal-to-noise ratio, at which to determine the carrier phase error and frequency error. The phase of the complex sample at this peak position gives an indication of the frequency error existing between the transmitter and receiver, since the conjugate product at this point, as developed by peak development module 110, should have yielded a zero-phase value in the absence of carrier frequency error. The conjugate product at this point of the signal peak, and in fact at every other point in the signal peak, should yield a zero-phase value because, mathematically, the conjugate product between symbol samples having equivalent phase (as do the samples at the leading and trailing portions of each received symbol) eliminates phase, in the absence of carrier frequency error. Any residual phase present at the peak of the signal output from the matched filter is proportional to carrier frequency error, and the frequency error is simple to calculate once the residual phase is determined.

Mathematically, the carrier frequency error $\Delta f$, produces the residual phase shift of $2\pi\Delta fT$ between the samples at the leading and trailing portions of an OFDM symbol that form a conjugate product. Thus, the frequency error is represented by the following equation:

$$\Delta f = \frac{\text{Arg}(G_{\max})}{2\pi T}$$

where $G_{max}$ is the peak of the matched filter output and Arg denotes the argument (phase) of a complex number—the complex sample—at the signal peak. The Arg function is equivalent to the four quadrant arctangent. Since the arctangent cannot detect angles outside of a $2\pi$ window, the frequency estimate is ambiguous up to a multiple of the channel spacing, $1/T$. Nevertheless, this frequency error estimate, together with the timing offset estimate provided by the location of the signal peak, is sufficient to allow the commencement of symbol demodulation. As demodulation proceeds, subsequent receiver frame boundary processing, not part of the present invention, resolves the frequency ambiguity.

In FIG. 3, both the matched-filtered, complex signal 175 and the temporal position or sample index, are provided as inputs to phase extractor 205. Phase extractor 205 extracts the residual phase from the complex sample representing the enhanced signal peak output from the matched filter. The extracted phase is provided to the input of frequency generator 210 which simply scales the extracted phase input thereto to produce the carrier frequency error $\Delta f$, which is then provided by acquisition module 75 to frequency correction circuit 65. Thus, the temporal position of the filtered signal peak provided at the output of matched filter 145 is indicative of symbol timing offset, and from the phase of this signal peak, carrier frequency error is derived.

In summary, the method of the present invention for recovering symbol timing offset and carrier frequency error from the OFDM signal, comprises the steps of:

receiving the OFDM modulated signal representing a series of OFDM symbols, each OFDM symbol including leading and trailing portions thereof, the leading and trailing portions having substantially equivalent phases and having temporally weighted amplitudes according to a predetermined temporal weighting function;

developing a boundary signal having a plurality of signal peaks therein representing a symbol boundary position for each received OFDM symbol, each said signal peak being developed responsive to an amplitude and phase correspondence produced between said leading and trailing portions of each received OFDM symbol;

enhancing the signal peak detectability of the boundary signal by additively superimposing a plurality of segments of the boundary signal to improve the signal-to-noise ratio of each of a plurality of enhanced signal peaks produced by this enhancing step;

establishing a temporal position of the symbol boundary from at least one of the enhanced signal peaks, this temporal position representing the received OFDM signal symbol timing offset; and, recovering the received OFDM signal carrier frequency error corresponding to the temporal position established previously.

In the step of enhancing signal peak detectability of the boundary signal, enhanced signal peaks produced by the additive superposition of the plurality of segments of the boundary signal are matched filtered to thus further enhance the signal-to-noise ratio of the plurality of enhanced signal peaks produced by the enhancing step.

Figure 4:
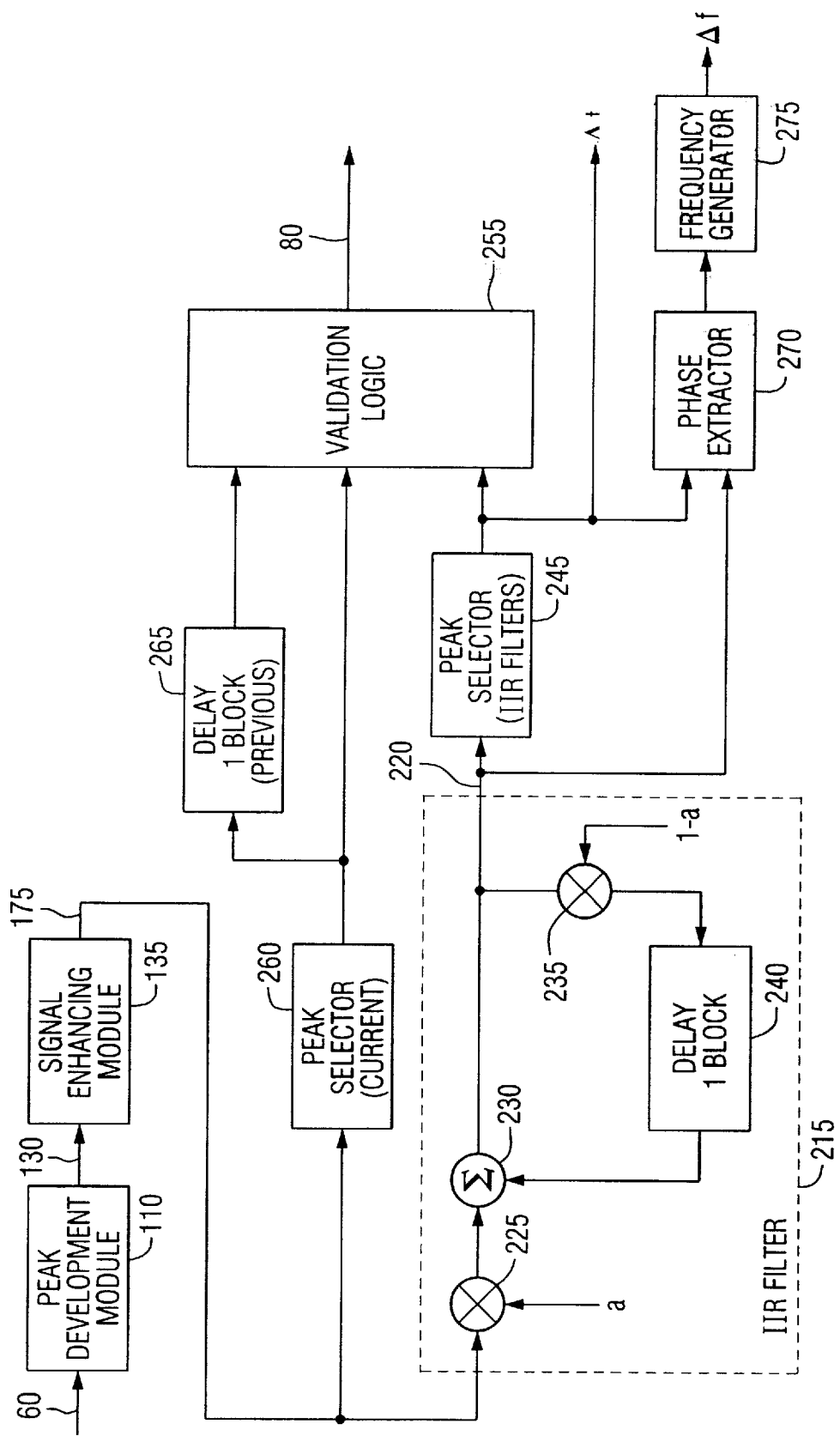
FIG. 4 is a block diagram of a second embodiment of the acquisition module of the present invention.

The foregoing method and apparatus for acquiring or recovering symbol timing offset and carrier frequency error from the received OFDM signal provide the most basic, unqualified symbol timing offset and carrier frequency error. Referring to FIG. 4, in a second embodiment of acquisition module 75, a more robust system for recovering symbol timing offset and carrier frequency error is presented, but at the expense of additional signal processing.

The second embodiment of acquisition module 75 includes signal processing features that specifically address problems associated with signal fading and interference phenomena. In a benign environment, in the absence of substantive fading, multi-path, and interference, the filtered enhanced signal peaks output from matched filter 145 of signal enhancing module 135 are each accurately representative of received symbol boundary position and correspondingly, received symbol timing offset. Under such conditions, a single detected signal peak output from matched filter 145 provides the requisite information leading to successful demodulation of symbols by OFDM demodulator 100.

On the other hand, in a noisy environment, multi-path and interferers have the effect of producing either additional false signal peaks or of eliminating actual signal peaks at the output of the matched filter. The additional signal processing presented by the second embodiment of acquisition module 75 combats these deleterious effects by validating the temporal consistency of the enhanced signal peaks output from signal enhancing module 135. If the enhanced signal peaks are validated, that is, temporally consistent in accordance with a predetermined criteria, then acquired symbol timing offset and carrier frequency error is considered valid, and the demodulation of OFDM signals can commence. Otherwise, the acquisition process is continued until such time that the symbol timing offset is validated.

Referring to FIG. 4, the second embodiment of acquisition module 75 includes peak development module 110 and signal enhancing module 135 as preliminary signal processing stages similar to the first embodiment of acquisition module 75. However, subsequent signal processing stages are added to validate the temporal consistency of the received signal. Signal 175 output from signal enhancing module 135 is provided to the input of an infinite impulse response (IIR) filter 215 which filters the signal input thereto and provides an IIR filtered signal 220 to an output thereof. The impulse response of the IIR filter is such that the most recently received signals input thereto are weighted more heavily than the previously received signals input thereto. Thus, the most recently filtered enhanced signal peaks input to IIR filter 215 are most heavily weighted at the output thereof.

More particularly, complex signal 175 input to IIR filter 215 comprises contiguous blocks of cumulative signal segments of $N_\alpha$ samples. IIR filter 215 filters the first sample of a first block with the first samples of successive blocks, to produce a filtered first sample. Similarly, the second sample of the first block is filtered with the second samples of subsequent blocks to produce a filtered second sample, and so on, to produce an output IIR filtered block of cumulative signal segments of $N_\alpha$ IIR filtered samples. In this way, IIR filter 215 can be considered as a bank of $N_\alpha$ IIR filters operating in parallel, each of the parallel filters filtering samples occupying the same predetermined position within each of the contiguous blocks of cumulative signal segments containing $N_\alpha$ input samples.

In detail, within IIR filter 215 are a first-stage coefficient multiplier 225 for multiplying coefficient a against samples of filtered, complex signal 175, and a subsequent accumulator 230 which accumulates the weighted samples output by coefficient multiplier 225, and the delayed, weighted samples output by feedback delay circuit 240. Second stage coefficient multiplier 235, which weights accumulated output samples by a predetermined factor, 1−a, and feedback delay circuit 240, together provide IIR filter functions well known in the art of IIR filters. However, it should be appreciated that the time delay imparted to feedback samples by feedback delay circuit 240 corresponds to the cumulative period or duration of the predetermined number of boundary signal segments that are additively superimposed by additive superposition module 140. For instance, where a block of 32 segments are additively superimposed, the 1 block delay imparted by delay circuit 240 is 32×T (an $N_\alpha$=1080 sample symbol period).

IIR filtered signal 220 output from IIR filter 215, similar to the filtered, complex signal 175 input to the IIR filter, comprises complex signal samples extending across contiguous IIR filtered cumulative signal segments, each segment having a full symbol period $T_\alpha$ and including a signal peak therein. Thus, symbol timing continues to be preserved at the output of the IIR filter.

Peak selector 245, operating similar to peak selector 190 described previously, establishes the temporal position of each IIR filtered signal peak input thereto, and provides this temporal position or sample index, to validation logic module 255. When validated, this temporal position is used as the symbol timing offset $\Delta t$, and the phase, as determined at the validated signal peak output from the IIR filter, is used for determining the carrier frequency error, by the method described previously in relation to FIG. 3.

Complex signal 175 is further provided as an input to peak selector 260, which establishes the temporal position of the enhanced signal peak present in a current cumulative signal segment of signal 175. This current cumulative signal segment represents the accumulation of the most recently received block of superimposed boundary signal segments. The current temporal position is provided to an input of validation logic module 255.

In addition to providing the current temporal position to an input of validation logic module 255, the previous temporal position, that is, the temporal position of the enhanced signal peak in the cumulative signal segment immediately preceding the current cumulative signal segment, is developed and provided as an input to validation logic module 255. This immediately preceding or previous cumulative signal segment, and the previous enhanced signal peak therein, represents an accumulation of the block of boundary signal segments immediately preceding the most recently received block thereof. Stated otherwise, and by way of specific example, the current temporal position represents the enhanced signal peak for the most recently received contiguous block of 32 superimposed boundary signal segments, while the previous temporal position is representative of the immediately preceding 32 superimposed boundary signal segments.

The previous temporal position is developed by imparting a time delay to the present temporal position. The time delay corresponds to the cumulative period of one block (the predetermined number) of boundary signal segments that are additively superimposed to develop a cumulative signal segment. In the example above, this time delay corresponds to $32 \times T_\alpha$ (an $N_\alpha=1080$ sample symbol period). Delay circuit 265 provides the requisite delay to the current temporal position input thereto, and provides at its output the previous temporal position, that is then input to validation logic module 255.

In brief summary of the foregoing, the following set of temporal positions are provided as inputs to validation logic module 255:

1) The IIR temporal position, corresponding to the position of the IIR filtered signal peak in the most recently provided IIR filtered signal segment (output from the IIR filter);
2) The current temporal position, corresponding to the position of the signal peak in the most recently provided cumulative signal segment; and
3) The previous temporal position, corresponding to the position of the signal peak in the immediately preceding cumulative signal segment.

Validation logic module 255 performs a predetermined temporal or positional correlation between the inputs thereto to establish whether the signal peaks output by IIR filter 215, as indicated at the output of peak selector 245, are temporally valid. Specifically, validation logic module 255 determines whether both the current and previous signal peak positions are aligned within a predetermined number of samples, for example, 10 samples, with respect to the IIR signal peak position. If they are, then the temporal position of the IIR filtered signal peak is determined valid and is used for symbol timing purposes. Additionally, the validated IIR filtered signal peak, corresponding to this validated temporal position, is used to determine carrier frequency error in the same manner as was described previously, using phase extractor 270 and frequency generator 275 (FIG. 4).

Referring to both FIGS. 2 and 4, after the temporal position has been validated, validation logic module 255 of acquisition module 75 indicates such validation to control and tracking module 85 by way of acquisition status signal 80. In turn, control and tracking module 85, via demodulator control signal 90, enables the demodulation process as executed by OFDM demodulator 100. Whether validation logic module 255 is partitioned to exist within acquisition module 75 or within control and tracking module 85, and the specific mechanism by which OFDM demodulator 100 or the demodulation produced thereby, is enabled, are not important to the specifics of the present invention. What is important in the second embodiment of acquisition module 75 is that the acquisition process be validated to thus indicate successful acquisition of symbol timing offset and carrier frequency error as a prerequisite to the acceptance of demodulated data output from OFDM demodulator 100, as optimally demodulated data.

In the event that validation logic module 255 is unable to validate the temporal position of the IIR filtered signal peak, the acquisition process continues until such time as validation of symbol timing offset does occur.

The additional signal processing provided in the second embodiment of the acquisition module of the present invention ensures demodulation of the received OFDM signal only after symbol timing offset and carrier frequency error have been successfully recovered from the received signal. In the presence of signal scattering, multi-path and other signal interference, the second embodiment provides a level of confidence that the received symbol demodulator in the receiver provides correctly demodulated data at the output thereof.

By further providing a receiver that employs diversity selection and combining between redundantly transmitted and received signals, the ability of the receiver of the present invention to combat the aforementioned deleterious signal effects is even further enhanced. In the third embodiment of the present invention, such a diversity system for recovering symbol timing offset and carrier frequency error from a diversity OFDM signal is provided.

The OFDM modulator provided at the transmitter end of the diversity system of the third embodiment operates in a fashion similar to OFDM modulator module 25, discussed in relation to the first embodiment of the present invention, with the exception that a diversity OFDM signal is provided at the output thereof. Specifically, the transmitter produces and transmits to the diversity receiver of the third embodiment an OFDM modulated signal in both an upper and a lower frequency sideband, where each of the sidebands encompasses a plurality of OFDM modulated frequency carriers (FIG. 1*a*), and where the sidebands together form a series of composite OFDM symbols, as shown in FIG. 1*b*.

This diversity OFDM signal is transmitted by the OFDM diversity transmitter to the OFDM diversity receiver, in the same manner as described in relation to the first embodiment of the present invention. It should, however, be appreciated that in this third embodiment, the diversity receiver includes both an upper and a lower frequency sideband acquisition module and additional signal processing required to effect diversity selection and combining between the two.

Figure 5:
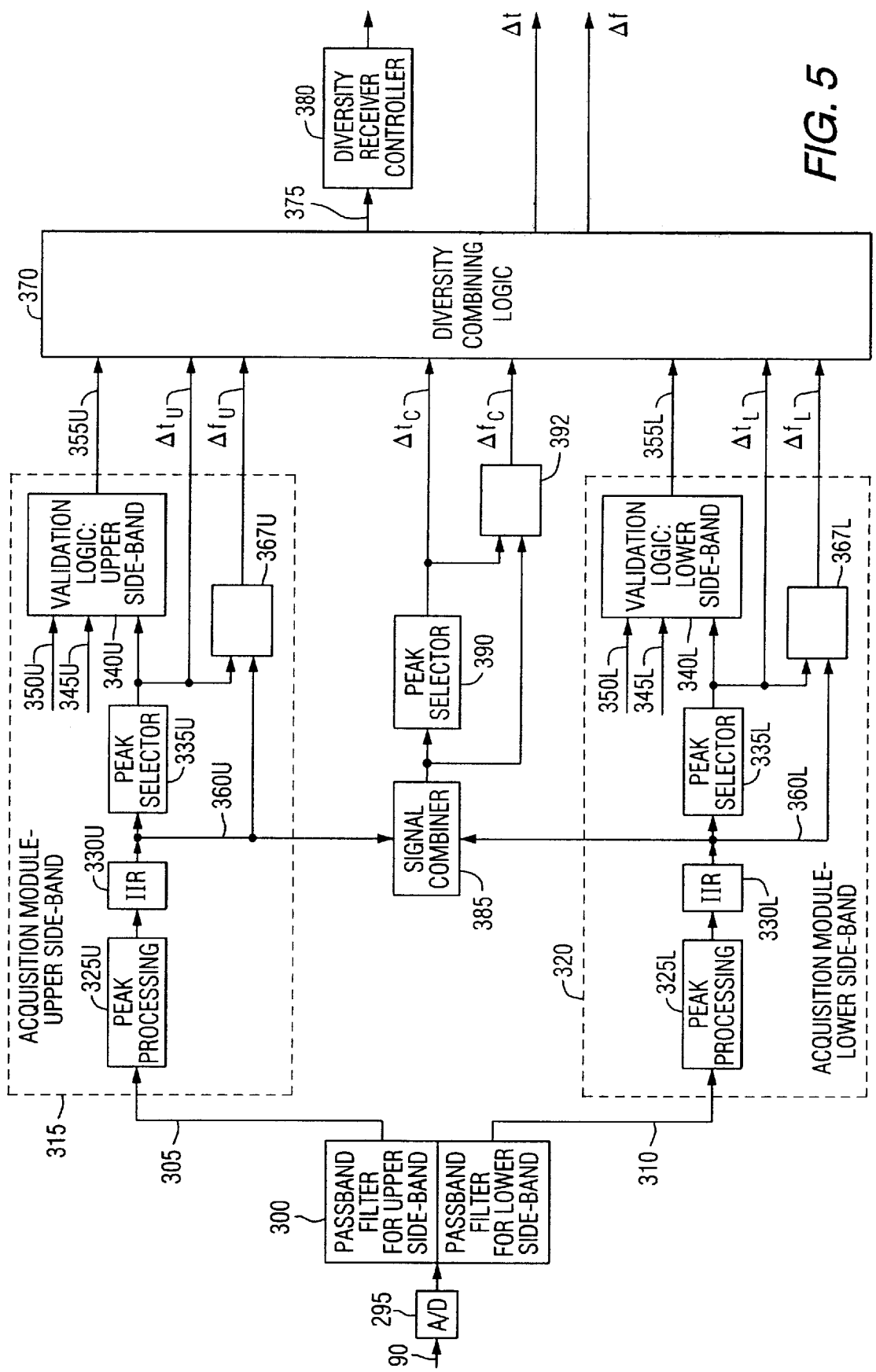
FIG. 5 is a block diagram of a third embodiment of the acquisition module of the present invention.

Referring to FIG. 5, in the third embodiment of the present invention, the diversity receiver includes a front-end receiver module, not shown, that provides a received analog OFDM signal to the input of A/D 295. The sampled signal output from A/D 295 is provided to the input of sideband separator 300 which passband filters both the upper and lower frequency sidebands present in the received signal to provide an upper sideband signal 305 and a lower sideband signal 310 at respective outputs thereof Upper sideband signal 305 is provided as an input to upper sideband acquisition module 315 while lower sideband signal 310 is provided as an input to lower sideband acquisition module 320. Additionally, both signals 305 and 310 are respectively provided to at least one receiver circuit, such as at least one correction circuit and/or demodulator, etc.

Up to this point, the signal processing, as represented by A/D 295, sideband separator 300 (the passband filters), and the respectively fed acquisition modules 315,320, substantially replicates the signal processing described in relation to the first and second embodiments of the present invention, with the exception that both upper and lower sideband paths are presented. Stated otherwise, in the third embodiment, each of the upper and lower frequency sidebands are subjected to the signal processing stages described previously. Further, the various signals flowing between the various signal processing stages have the same characteristics as were previously described. Thus, with regard to the upper and lower sideband acquisition modules, only a brief description is provided for those aspects thereof that overlap earlier description.

Returning again to FIG. 5, upper sideband signal 305 is subjected, in sequence, to signal processing by peak processing module 325U, which includes both the peak development module and signal enhancing module described previously, and IIR filter module 330U which provides IIR filtered signal peaks to the output thereof for subsequent input to peak selector 335U.

Input to upper sideband validation logic module 340U are the following signals:

1) the temporal positions representing IIR filtered signal peaks output from peak selector 335U;
2) the current temporal positions 345U of signal peaks corresponding to the current blocks of contiguous signal segments additively superimposed by peak processing module 325U; and,
3) the previous temporal positions 350U of signal peaks corresponding to the previous blocks of contiguous signal segments output from peak processing module 325U.

Since the signal processing modules that generate signals 345U and 350U were described previously in relation to FIG. 4, they are not redundantly reproduced here, and are thus omitted from FIG. 5 for purposes of descriptive expediency and clarity.

Upper sideband validation module 340U operates in the same manner as was described previously in relation to the second embodiment of the present invention (FIG. 4), and provides an upper sideband acquisition status signal 355U at an output thereof responsive to a positional correlation between the temporal positions at its three inputs. Upper sideband acquisition status signal 355U is provided to diversity combining logic module 370.

Upper sideband acquisition module 315 further provides an upper sideband symbol timing estimate $\Delta t_u$ to the diversity combining logic module 370. The carrier frequency error $\Delta f_u$ is derived by module 367U in accordance with previously discussed techniques. Specifically, the error is derived by module 367U, which incorporates a phase extractor and frequency generator therein, responsive to the IIR filtered signal 360U and timing estimate $\Delta t_u$ input thereto.

Having briefly described the operation of upper sideband acquisition module 315, it is sufficient to appreciate that the signal processing performed by lower sideband acquisition module 320 proceeds in a substantially equivalent manner as in the upper sideband. More specifically, as between the two sidebands, operationally equivalent signal processing modules bear the same numeric designation in FIG. 5; the "U" suffix designating the upper sideband, the "L" suffix designating the lower sideband.

Lower sideband acquisition module 320 provides symbol timing estimate $\Delta t_L$ and a carrier frequency error correction signal $\Delta f_L$ to diversity combining logic module 370. Further, lower sideband validation logic module 340L provides lower sideband acquisition status signal 355L to diversity combining logic module 370.

The diversity receiver further includes a signal combiner 385 for combining corresponding IIR filtered samples output from the IIR filters 330U,330L of the upper and lower sideband acquisition modules 315,320. The resultant combined signal is input to peak selector 390 which operates in a substantially similar fashion to the previously described peak selector. A combined symbol timing offset $\Delta t_c$ is output from combined peak selector 390, and a combined carrier frequency error $\Delta f_c$ is derived and output by module 392, both of these signals being provided as inputs to diversity combining logic module 370. It should be appreciated that by combining upper and lower sideband signals, as by signal combiner 385, additional processing gain can be achieved, thus leading to further accuracy in both symbol timing offset and carrier frequency error estimation, as represented by $\Delta t_c$ and $\Delta f_c$, respectively.

As illustrated in FIG. 5, the diversity receiver includes diversity combining logic module 370, which has input thereto the following signals:

1) upper and lower sideband status signals 355U and 355L;
2) upper and lower sideband symbol timing offsets $\Delta t_u$ and $\Delta t_L$;
3) upper and lower sideband carrier frequency errors $\Delta f_u$ and $\Delta f_L$; and,
4) combined symbol timing offset $\Delta t_c$ and combined carrier frequency $\Delta f_c$.

Responsive to these inputs, diversity combining logic module 370 provides at outputs thereof a diversity signal 375, timing offset $\Delta t$, and carrier frequency error $\Delta f$. Diversity status signal 375 is provided as an input to diversity receiver controller module 380, whereas the timing offset and frequency error are provided to the demodulation processing module to correct timing and frequency, as described previously.

Diversity combining logic module 370 provides the diversity combining signal processing required to select the appropriate signal pair, consisting of a symbol timing offset and a corresponding carrier frequency error, from either the upper or the lower frequency sideband acquisition module, or from a combination of both (the combined signal pair), or as the case may be, to determine that further acquisition is required. Essentially, module 370 serves as a "smart" multiplexer to conditionally select between the three symbol timing offset and carrier frequency error pairs input thereto, for its outputs t and f.

In the operation of the diversity receiver, each receiver sideband, including the upper and lower sideband acquisition modules, operate, for the most part, independently with respect to each other. Each of the validation logic modules 340U and 340L operate as described in the second embodiment (FIG. 4), providing as outputs their respective acquisition status signals 355U, 355L. That is, upper sideband validation logic module 340U validates upper frequency sideband symbol timing offset, as represented by temporal positions output by peak selector 335U, and lower sideband validation logic module 340L validates lower frequency sideband timing offset, as represented by the temporal signal peak positions output from peak selector 335L.

Figure 8:
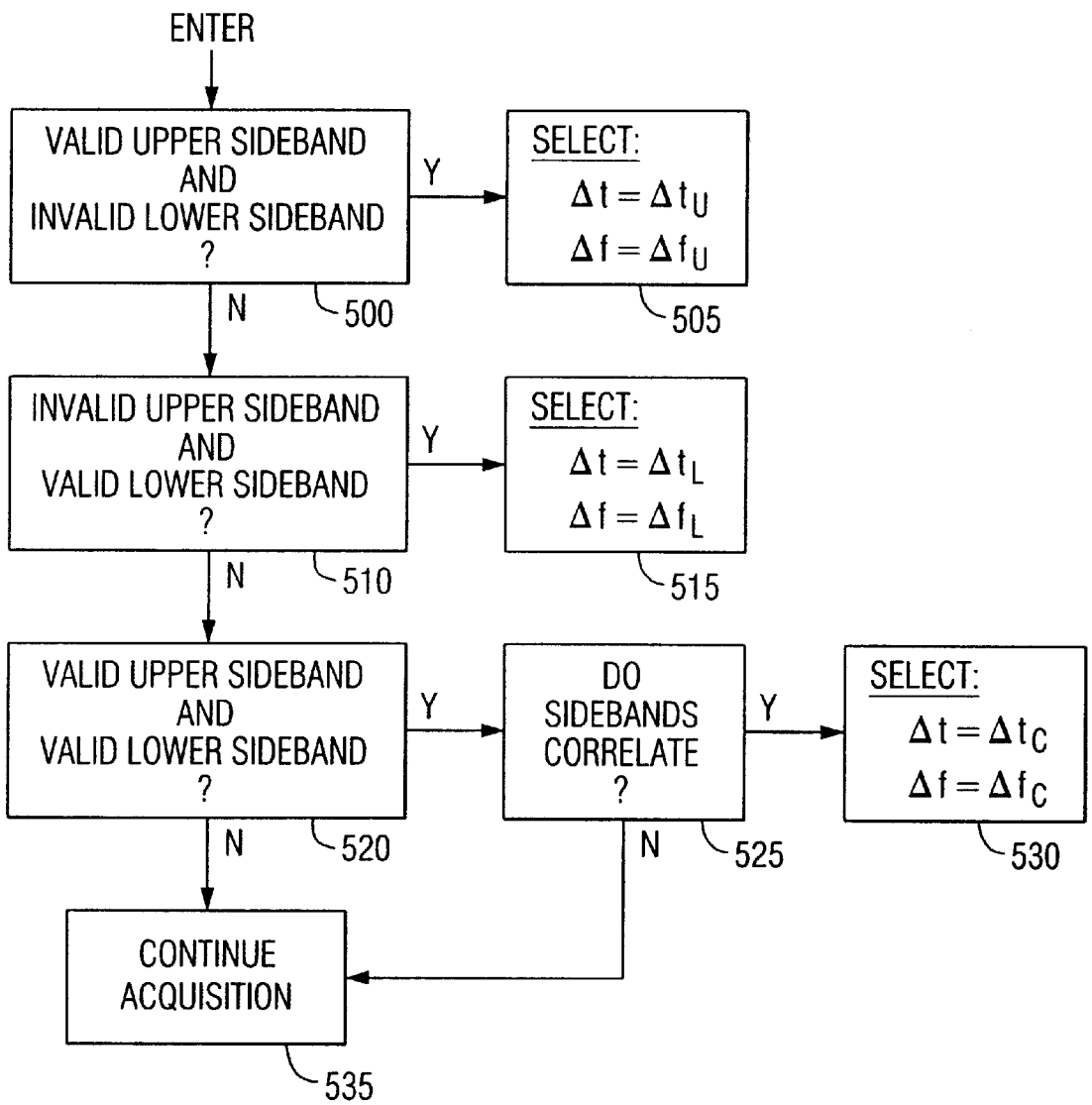
FIG. 8 is a block diagram representing the decisional and selection logic blocks for the diversity combining logic module of the third embodiment (FIG. 5) of the present invention.

Referring to FIG. 8, which represents the decisional and selection (multiplexing) logic executed by diversity combining logic module 370, module 370 performs the following decisional (validation) steps, and responsive thereto, selects the following symbol timing offset and carrier frequency error for output therefrom:

1) upper sideband symbol timing offset $\Delta t_u$ and carrier frequency $\Delta f_u$ are selected for the demodulation process if upper sideband acquisition status signal 355U indicates valid upper sideband symbol timing offset, and lower sideband acquisition status signal 355L indicates invalid lower sideband symbol timing offset (FIG. 8, blocks 500 and 505);
2) lower sideband symbol timing offset $\Delta t_L$ and carrier frequency error $\Delta f_L$ are selected for the demodulation process if lower sideband acquisition status signal 355L indicates valid lower sideband symbol timing offset, and upper sideband acquisition status signal 355U indicates invalid upper sideband symbol timing offset (FIG. 8, blocks 510 and 515);

3) if the upper and lower sideband symbol timing offsets are both validated, then diversity combining logic module 370 determines whether a predetermined temporal correlation exists between the validated upper and lower sideband symbol timing offsets. That is, if the upper and lower sideband symbol timing offsets are within a predetermined number of samples of each other, for example, 10 samples, then combined symbol timing offset $\Delta t_c$, as established at the output of peak selector 390, and combined carrier frequency error $\Delta f_c$, as established at the output of module 392, are selected for the demodulation process (FIG. 8, blocks 520, 525 and 530); and 4) if the upper sideband and lower sideband symbol timing offsets are both validated (as in the previous step), but the upper and lower sideband symbol timing offsets are not temporally correlated, or if neither of the sideband signal timing offsets are validated (according to the previous step), then no symbol timing offset, nor any carrier frequency error, is selected and the acquisition process continues (FIG. 8, blocks 520, 525 and 535).

Since the combined signal peak is formed as an additive combination of the temporally correlated upper and lower sideband signal peaks, and since the temporal positions of these upper and lower sideband signal peaks are known, then the temporal position of the combined signal peak is necessarily constrained to lie within a predetermined range of positions, relative to its constituent signal peaks. Thus, peak selector 390 need only search within this predetermined range of positions, say 50 samples either side of an upper or lower sideband temporal position, in order to find and establish the temporal position of the combined signal peak. By limiting the range of search, processing time, and acquisition time is reduced, thus increasing the overall efficiency of the process.

Diversity combining logic module 370 can be implemented as discrete digital logic (AND, OR, NOR, XOR, etc.), gate array logic, software modules executing on a processor, a combination of the foregoing, or using any other conventional approach. Further, it should be appreciated that, in the present invention, the particular partitioning of logic functionality between the upper and lower sideband validation logic modules and the diversity combining logic module is exemplary. Any alternative arrangement can be used, provided the overall validation and selection logic functions are preserved.

In brief summary of the operation of module 370, if only one of the sidebands has a valid symbol timing offset, then such is used for demodulation. On the other hand, if each sideband has a valid symbol timing offset, and these valid symbol timing offsets are temporally correlated in accordance with a predetermined criteria, then IIR filtered signal samples taken from each sideband are combined, and the symbol timing generated therefrom, that is, a combined symbol timing offset and frequency error, is chosen for the demodulation process. If, on the other hand, each sideband is validated, but the sidebands are not temporally correlated each to the other, or if neither sideband is validated, then no symbol timing offset is chosen, and acquisition continues.

Throughout this process, diversity receiver controller 380 asserts the requisite control over the receiver circuits to control the operation thereof in accordance with selection outputs 375 provided by diversity combining logic module 370.

In summary, the diversity method of the present invention for recovering symbol timing offset and carrier frequency error from the OFDM signal, comprises the steps of:

transmitting the OFDM modulated signal in both an upper and a lower frequency sideband, each of the sidebands encompassing a plurality of OFDM modulated frequency carriers and a series of OFDM symbols;

receiving the OFDM modulated signal of the upper frequency sideband and providing a first (upper sideband) received signal output and the OFDM modulated signal of the lower frequency sideband and providing a second (lower sideband) received signal output;

developing a first (upper sideband) symbol timing offset and frequency error corresponding to OFDM symbols in the first received signal;

developing a second (lower sideband) symbol timing offset and frequency error corresponding to OFDM symbols in the second received signal;

validating the first symbol timing offset based on a predetermined temporal consistency thereof;

validating the second symbol timing offset based on a predetermined temporal consistency thereof;

selecting an optimum symbol timing offset from the first and second symbol timing offsets responsive to the validating steps; and, demodulating a series of OFDM symbols of at least one of the sidebands using the optimum symbol timing offset.

The method also includes the steps of developing a third (combined) symbol timing offset corresponding to a combination of first and second timing signals respectively representative of the first and second symbol timing offsets; and, selecting the third symbol timing offset as the optimum symbol timing responsive to predetermined timing conditions.

The diversity combining architecture and methodology described above provides a robust receiver acquisition system wherein symbol timing and carrier frequency can be successfully recovered even when an entire sideband is blocked as by a fade or interference. On the other hand, by combining upper and lower sideband signals, as by signal combiner 385, additional processing gain can be achieved when the combined symbol timing (output from peak selector 390) is utilized.

Throughout the foregoing detailed description of the present invention, the various signal processing modules operate on the received, sampled OFDM signal, comprising the series of OFDM symbols. It is most important to appreciate that it is the OFDM modulator and not the receiver that establishes the predetermined number of samples in each symbol, such as the 1080 samples used for illustrative purposes. The sample rate at the receiver, as determined at A/D 50, which in turn establishes the actual number of received samples for each received symbol, is set based upon a variety of criteria not important to the salient features of the present invention, including for instance the Nyquist criteria, etc. A/D 50 can either under or over-sample the received symbols in establishing the number of received samples per symbol, or alternatively, can generate the same number of samples per symbol at the receiver as were established at the modulator.

What is important in the signal processing of the present invention, is that the symbol timing be preserved at each respective stage thereof. So long as each stage of processing is based upon a symbol period's worth, or multiple thereof, of received samples, it matters not whether this number of samples is below, the same as, or above the number of symbol samples established at the modulator; symbol timing will always be preserved. In summary, the foregoing descriptions of the detailed embodiments in no way limit the possible variations of the received signal sample rate in the present invention.

Extending this concept further, the preservation of symbol timing throughout each of the signal processing stages can be achieved under a variety of embodiments of the present invention, not previously described. Again, so long as signal processing is based upon a symbol period's worth, or multiple thereof, of samples, then, for instance, the additive superposition module need not accumulate each sample input thereto. Every other or every third sample, for example, could be accumulated over a symbol period. Further, the boundary signal segments accumulated to produce a cumulative signal need not be contiguous; every other or every third segment, for example, could be superimposed, so long as the approach is consistently applied to all incoming boundary signal segments.

Another alternative embodiment of the present invention stems from the linear, and thus interchangeable, nature of both the additive superposition and matched filter processes. Although it is preferable to precede matched filtering with additive superposition in the present invention, such is not a limitation thereof. Their sequencing can be swapped, to thus provide matched filtering prior to additive superposition.

Note that the signal processing circuits or modules in each of the embodiments of the present invention, including but not being limited to the peak development module, additive superposition and matched filter modules of the signal enhancement module, peak selector, phase extractor and frequency generator, validation logic module, diversity combining logic module, OFDM modulator module, and all of the circuits constituting the foregoing modules can be implemented using a variety of techniques and technologies.

The modules can be implemented as digital logic in gate arrays, application specific integrated circuits, field programmable gate arrays such as are provided by Zilinx Corp., programmable logic arrays and devices, etc.

Alternatively, the modules can be implemented as programs executing on computer hardware platforms such as custom built or commercially available digital signal processors or microprocessors.

Further, the signal processing modules can be implemented exclusively as computer program routines that execute on a computer workstation, for applications including, for example, simulations.

Even further, analog processing can replace digital processing if desired.

The overall system of the present invention can be implemented using a virtually unlimited combination of the foregoing exemplary technologies.

Although this invention has been described in connection with specific forms and embodiment thereof, it will be appreciated that various modifications other than those discussed above may be resorted to without departing from the spirit or scope of the invention. For example, functionally equivalent elements may be substituted for those specifically shown and described, proportional quantities of the elements shown and described may be varied, and in the formation method steps described, particular steps may be reversed or interposed, all without departing from the spirit or scope of the invention as defined in the appended claims.

What is claimed is:

1. A system for recovering a symbol timing offset and carrier frequency error from an orthogonal frequency division multiplexed (OFDM) signal, said system comprising:

means for receiving an OFDM modulated signal representing a series of OFDM symbols, each OFDM symbol including a leading portion and a trailing portion thereof, said leading and trailing portions having substantially equivalent predetermined phases and having temporally weighted amplitudes according to a predetermined temporal weighting function, said receiver means providing a received signal to an output thereof;

peak development means developing a boundary signal having a plurality of signal peaks representing a symbol boundary position for each received OFDM symbol, each said signal peak being developed responsive to an amplitude and phase correspondence produced between said leading and trailing portions of each said received OFDM symbol;

means for enhancing signal peak detectability of said boundary signal, said enhancement means including means for additively superimposing a plurality of segments of said boundary signal, said enhancement means outputting an enhanced signal peak corresponding to a predetermined number of said plurality of segments and having an improved signal-to-noise ratio;

means for establishing a temporal position indicative of said symbol boundary position from at least one enhanced signal peak output from said enhancement means, said temporal position representing a received OFDM signal symbol timing offset; and, means for recovering a received OFDM signal carrier frequency error corresponding to said temporal position.

2. The system as recited in claim 1 where said peak development means includes means for forming complex conjugate products between said leading and trailing portions of each said received OFDM symbol.

3. The system as recited in claim 2 where said peak development means includes means for forming a complex conjugate product between said received signal and a delayed replica thereof obtained by delaying said received signal by a predetermined time, said predetermined time being less than an OFDM symbol period.

4. The system as recited in claim 1 wherein said enhancement means includes superposition means for superimposing said predetermined number of segments of said boundary signal, each of said segments having a respective one of said plurality of signal peaks included therein; and, means for accumulating superimposed signal levels over said superimposed predetermined number of segments output from said superposition means, to produce a cumulative signal having a cumulative signal peak exhibiting said improved signal-to-noise ratio.

5. The system as recited in claim 4 wherein each said segment has a predetermined temporal length corresponding to an integer multiple of an OFDM symbol period and includes a signal value at each of a plurality of temporal positions extending across said temporal length of said segment, said enhancement means including means for accumulating each signal value occupying a predetermined position in each segment in said predetermined number thereof to produce a cumulative signal value for said predetermined position over said predetermined number of segments; and, means for forming said cumulative signal, said cumulative signal including a cumulative signal value in each of said plurality of temporal positions extending across said cumulative signal.

6. The system as recited in claim 1 wherein said enhancement means includes a filter for further improving said signal-to-noise ratio of said enhanced signal peak output from said enhancement means.

7. The system as recited in claim 6 wherein said filter is a matched filter having a temporal impulse response matched to an amplitude envelope of each of said signal peaks developed by said peak development means.

8. The system as recited in claim 1 wherein said predetermined temporal weighting function is characterized by symmetrically ascending and descending amplitude tapers at said leading and trailing portions of each said OFDM symbol.

9. The system as recited in claim 8 wherein said amplitude tapers are Nyquist root raised cosine tapers.

10. The system as recited in claim 1 wherein said means for establishing a temporal position includes a filter for filtering at least one enhanced signal peak output from said enhancement means to produce a filtered enhanced signal, whereby a position of a maximum signal magnitude detected in said filtered enhanced signal corresponds to said temporal position.

11. The system as recited in claim 10 wherein said filter is an infinite impulse response filter.

12. The system as recited in claim 10 wherein said system further includes:

means for determining a valid temporal position responsive to a predetermined temporal correlation between said temporal position and a pair of positions established for a respective successive pair of enhanced signal peaks output from said enhancement means; and, wherein said receiver means includes a demodulator for demodulating said received OFDM symbols responsive to a symbol timing offset derived from a validated temporal position output from said means for establishing a temporal position.

13. A system for recovering a symbol timing offset and carrier frequency error from an orthogonal frequency division multiplexed (OFDM) signal, comprising:

means for receiving an OFDM modulated signal including a series of OFDM symbols, each OFDM symbol including a leading portion and a trailing portion thereof, said leading and trailing portions having substantially equivalent predetermined phases and having temporally weighted amplitudes according to a predetermined temporal weighting function, said receiver means providing a received signal to an output thereof;

peak development means developing a boundary signal having a plurality of signal peaks representing a symbol boundary position for each received OFDM symbol, each said signal peak being developed responsive to an amplitude and phase correspondence produced between said leading and trailing portions of each said received OFDM symbol;

means for enhancing signal peak detectability of said boundary signal, said enhancement means including a filter for filtering signals produced responsive to said boundary signal, said filter improving a signal-to-noise ratio of each of a plurality of enhanced signal peaks output from said enhancement means;

means for establishing a temporal position indicative of said symbol boundary position from at least one of said enhanced signal peaks output from said enhancement means, said temporal position representing a received OFDM signal symbol timing offset; and, means for recovering a received OFDM signal carrier frequency error corresponding to said temporal position.

14. The system as recited in claim 13 where said peak development means includes means for forming complex conjugate products between said leading and trailing portions of each said received OFDM symbol.

15. The system as recited in claim 14 where said peak development means includes means forming a complex conjugate product between said received signal and a delayed replica thereof obtained by delaying said received signal by a predetermined time, said predetermined time being less than an OFDM symbol period.

16. The system as recited in claim 13 wherein each said signal peak developed by said peak development means has an amplitude envelope corresponding to said predetermined temporal weighting function.

17. The system as recited in claim 16 wherein said filter in said enhancement means is a matched filter having a temporal impulse response matched to said amplitude envelope.

18. The system as recited in claim 13 wherein said predetermined temporal weighting function is characterized by symmetrically ascending and descending amplitude tapers at said leading and trailing portions of each said OFDM symbol.

19. The system as recited in claim 18 wherein said amplitude tapers are Nyquist root raised cosine tapers.

20. The system as recited in claim 13 wherein said enhancement means further includes means for additively superimposing a plurality of segments of said boundary signal developed by said peak development means to further improve said signal-to-noise ratio of each of said enhanced peaks output from said enhancement means.

21. The system as recited in claim 20 wherein said additive superposition means includes superposition means for superimposing a predetermined number of segments, each segment having a signal peak included therein; and means for accumulating superimposed signal levels over said superimposed predetermined number of segments output from said superposition means, to produce a cumulative signal having a cumulative signal peak exhibiting an improved signal-to-noise ratio.

22. The system as recited in claim 21 wherein each said segment has a predetermined temporal length corresponding to an integer multiple of an OFDM symbol period and includes a signal value at each of a plurality of temporal positions extending across said temporal length of said segment, and wherein said additive superposition means includes means for accumulating each signal value occupying a predetermined position in each segment of said predetermined number thereof, to produce a cumulative signal value for said predetermined position over said predetermined number of segments; and, means for forming said cumulative signal, said cumulative signal including a cumulative signal value in each of said plurality of positions extending across said cumulative signal.

23. The system as recited in claim 13 wherein said means for establishing a temporal position includes
a filter for filtering an enhanced signal output from said enhancement means to produce a filtered enhanced signal, whereby a position of a maximum signal magnitude detected in said filtered enhanced signal corresponds to said temporal position.

24. The system as recited in claim 23 wherein said filter is an infinite impulse response filter.

25. The system as recited in claim 23 wherein said system further includes
means for determining a valid temporal position responsive to a predetermined temporal correlation between said temporal position and a pair of positions established for a respective successive pair of enhanced signal peaks output from said enhancement means; and,
wherein said receiver means includes a demodulator for demodulating said received OFDM symbols responsive to a symbol timing derived from a validated temporal position output from said means for establishing a temporal position.

26. A method for recovering a symbol timing offset and carrier frequency error from an orthogonal frequency division multiplexed (OFDM) signal, comprising the steps of:
receiving an OFDM modulated signal representing a series of OFDM symbols, each OFDM symbol including a leading portion and a trailing portion thereof, said leading and trailing portions having substantially equivalent predetermined phases and having temporally weighted amplitudes according to a predetermined temporal weighting function;
developing a boundary signal having a plurality of signal peaks representing a symbol boundary position for each received OFDM symbol, each said signal peak being developed responsive to an amplitude and phase correspondence produced between said leading and trailing portions of each said received OFDM symbol;
enhancing signal peak detectability of said boundary signal, said enhancing step including the step of additively superimposing a plurality of segments of said boundary signal to improve a signal-to-noise ratio of each of a plurality of enhanced signal peaks produced by said step of enhancing;
establishing a temporal position of said symbol boundary from at least one of said enhanced signal peaks, said temporal position representing a received OFDM signal symbol timing offset; and,
recovering a received OFDM signal carrier frequency error corresponding to said temporal position.

27. The method as recited in claim 26 wherein said step of developing a boundary signal includes the step of forming complex conjugate products between said leading and trailing portions of each said received OFDM symbol to develop said signal peak, an amplitude envelope of said signal peak corresponding to said predetermined temporal weighting function.

28. The method as recited in claim 26 wherein said step of enhancing detectability includes the step of filtering signals to further improve said signal-to-noise ratio of each of said plurality of said enhanced signal peaks produced by said step of enhancing.

29. The method as recited in claim 28 wherein said step of filtering includes the step of providing a matched filter having an impulse response matched to an amplitude envelope of each said signal peak developed in said step of developing.

30. The method as recited in claim 26 wherein said step of additive superposition includes the steps of
superimposing a predetermined number of segments of said boundary signal, each of said segments having a signal peak included therein; and,
accumulating superimposed signal levels over said predetermined number of superimposed segments to produce a cumulative signal having a cumulative signal peak exhibiting an improved signal-to-noise ratio.

31. The method as recited in claim 26 wherein said step of establishing a temporal position includes the steps of
filtering an enhanced signal produced by said step of enhancing, to produce a filtered enhanced signal; and,
detecting a maximum signal magnitude in said filtered enhanced signal and determining a temporal position thereof.

32. The method as recited in claim 26 further including the step of validating said temporal position responsive to a predetermined temporal correlation between said temporal position and a pair of positions established for a respective successive pair of enhanced signal peaks produced by said step of enhancing detectability.

33. The method as recited in claim 32 further including the step of demodulating said OFDM symbols responsive to said validated temporal position.

34. A method for recovering a symbol timing and carrier frequency error from an orthogonal frequency division multiplexed (OFDM) signal, comprising the steps of:
receiving an OFDM modulated signal representing a series of OFDM symbols, each OFDM symbol including a leading portion and a trailing portion thereof, said leading and trailing portions having substantially equivalent predetermined phases and having temporally weighted amplitudes according to a predetermined temporal weighting function;
developing a boundary signal having a plurality of signal peaks representing a symbol boundary position for each received OFDM symbol, each said signal peak being developed responsive to an amplitude and phase correspondence produced between said leading and trailing portions of each said received OFDM symbol;
enhancing signal peak detectability of said boundary signal, said enhancing step including the step of matched filtering to improve a signal-to-noise ratio of each of a plurality of enhanced signal peaks produced by said step of enhancing detectability;
establishing a temporal position of said symbol boundary from at least one of said enhanced signal peaks, said temporal position representing a received OFDM signal symbol timing offset; and,
recovering a received OFDM carrier frequency error corresponding to said temporal position.

35. The method as recited in claim 34 wherein said step of developing a boundary signal includes the step of forming complex conjugate products between said leading and trailing portions of each said OFDM symbol to develop said signal peak, an amplitude envelope of said signal peak corresponding to said predetermined temporal weighting function.

36. The method as recited in claim 35 wherein said step of matched filtering includes the step of providing a matched filter having an impulse response matched to said amplitude envelope of said signal peak.

37. A diversity system for recovering a symbol timing offset and carrier frequency error from an orthogonal frequency division multiplexed (OFDM) signal, comprising:

a transmitter transmitting an OFDM modulated signal in both an upper and a lower frequency sideband, each of said sidebands encompassing a plurality of OFDM modulated frequency carriers and a series of OFDM symbols;

receiving means for receiving said OFDM modulated signal of said upper frequency sideband and providing a first received signal output and said OFDM modulated signal of said lower frequency sideband and providing a second received signal output;

first recovery means developing a first symbol timing offset corresponding to OFDM symbols in said first received signal;

second recovery means developing a second symbol timing offset corresponding to OFDM symbols in said second received signal;

first validating means validating said first symbol timing offset based on a predetermined temporal consistency thereof;

second validating means validating said second symbol timing offset based on a predetermined temporal consistency thereof;

selection means selecting an optimum symbol timing offset from said first and second symbol timing offsets responsive to signals output from said first and second validating means; and, means for demodulating at least one of said series of OFDM symbols using said optimum symbol timing offset.

38. The system as recited in claim 37 wherein said selection means includes means for selecting said first symbol timing offset responsive to an output of said first validating means indicative of a valid first symbol timing offset and an output of said second validating means indicative of invalid second symbol timing offset; and means for selecting said second symbol timing offset responsive to an output of said first validating means indicative of an invalid first symbol timing offset and an output of said second validating means indictive of a valid second symbol timing offset.

39. The system as recited in claim 37 further including means for developing a third symbol timing offset corresponding to a combination of first and second timing signals respectively representative of said first and second symbol timing offsets.

40. The system as recited in claim 39 wherein said selection means includes means for selecting said third symbol timing offset responsive to an output of said first validating means indicative of a valid first symbol timing offset, an output of said second validating means indicative of a valid second symbol timing offset, and a predetermined temporal consistency existing between said first and second symbol timing offsets.

41. The system as recited in claim 37 wherein each of said first and second recovery means includes peak development means for developing a boundary signal having a plurality of signal peaks representing a symbol boundary position for each received OFDM symbol in a respective one of said first and second received signals output from said receiving means;

means for enhancing signal peak detectability of said boundary signal; and means for establishing a temporal position indicative of a symbol boundary position from at least one enhanced peak output from said enhancement means.

42. The system as recited in claim 41 wherein said means for establishing a temporal position includes a filter for filtering an enhanced signal output from said enhancement means to produce a filtered enhanced signal; and, means for detecting a maximum signal magnitude in said filtered enhanced signal and for determining a temporal position thereof.

43. The system as recited in claim 41 wherein each of said first and second validation means includes means for determining a valid first symbol timing offset responsive to a predetermined temporal correlation between said temporal position and a pair of positions established for a respective successive pair of enhanced signal peaks output from said enhancement means.

44. A diversity method for recovering a symbol timing offset and carrier frequency error from an orthogonal frequency division multiplexed (OFDM) signal, comprising the steps of:

transmitting an OFDM modulated signal in both an upper and a lower frequency sideband, each of said sidebands encompassing a plurality of OFDM modulated frequency carriers and a series of OFDM symbols;

receiving said OFDM modulated signal of said upper frequency sideband and providing a first received signal output and said OFDM modulated signal of said lower frequency sideband and providing a second received signal output;

developing a first symbol timing offset corresponding to OFDM symbols in said first received signal;

developing a second symbol timing offset corresponding to OFDM symbols in said second received signal;

validating said first symbol timing offset based on a predetermined temporal consistency thereof;

validating said second symbol timing offset based on a predetermined temporal consistency thereof;

selecting an optimum symbol timing offset from said first and second symbol timing offsets responsive to said validating steps; and, demodulating at least one of said series of OFDM symbols using said optimum symbol timing offset.

45. The method as recited in claim 44 wherein said step of selecting an optimum symbol timing offset includes the steps of selecting said first symbol timing offset responsive to a valid first symbol timing offset and an invalid second symbol timing offset; and, selecting said second symbol timing offset responsive to a valid second symbol timing offset and an invalid first symbol timing offset.

46. The method as recited in claim 44 further including the step of developing a third symbol timing offset corresponding to a combination of first and second symbol timing signals respectively representative of said first and second symbol timing offsets.

47. The method as recited in claim 46 wherein said step of selecting an optimum symbol timing offset further includes the step of selecting said third symbol timing offset responsive to a valid first symbol timing offset, a valid second symbol timing offset, and a predetermined temporal consistency existing therebetween.

48. The method as recited in claim 44 wherein each of said steps of developing a first symbol timing offset and of developing a second symbol timing offset includes the steps of developing a boundary signal having a plurality of signal peaks representing a symbol boundary position for each received OFDM symbol in a respective one of said first and second received signals produced by said step of receiving;

enhancing signal peak detectability of said boundary signal; and establishing a temporal position indicative of said symbol boundary position from at least one enhanced signal peak produced by said step of enhancing detectability.

49. The method as recited in claim 48 wherein said step of establishing a temporal position includes the steps of filtering an enhanced signal produced by said step of enhancing detectability to produce a filtered enhanced signal; and, detecting a maximum signal magnitude in said filtered enhanced signal and determining a temporal position thereof.

50. The method as recited in claim 49 further including the step of developing a third symbol timing offset corresponding to an additive combination of each of said filtered enhanced signals produced respectively by said steps of developing a first symbol timing offset and developing a second symbol timing offset.

51. The method as recited in claim 50 wherein the step of selecting an optimum symbol timing offset further includes the step of selecting said third symbol timing offset responsive to a valid first symbol timing offset, a valid second symbol timing offset, and a predetermined temporal consistency existing therebetween.

52. The method as recited in claim 48 wherein each of said steps of validating said first and second symbol timing offsets includes the step of determining a valid symbol timing offset responsive to a predetermined temporal correlation existing between said temporal position and a pair of positions established for a respective successive pair of enhanced signal peaks produced by said step of enhancing detectability.

* * * * *